(12) United States Patent
Sun et al.

(10) Patent No.: US 11,037,019 B2
(45) Date of Patent: Jun. 15, 2021

(54) GENERATING MODIFIED DIGITAL IMAGES BY IDENTIFYING DIGITAL IMAGE PATCH MATCHES UTILIZING A GAUSSIAN MIXTURE MODEL

(71) Applicant: Adobe Inc., San Jose, CA (US)

(72) Inventors: Xin Sun, Sunnyvale, CA (US); Sohrab Amirghodsi, Seattle, WA (US); Nathan Carr, San Jose, CA (US); Michal Lukac, San Jose, CA (US)

(73) Assignee: ADOBE INC., San Jose, CA (US)

( * ) Notice: Subject to any disclaimer, the term of this patent is extended or adjusted under 35 U.S.C. 154(b) by 98 days.

(21) Appl. No.: 15/906,783

(22) Filed: Feb. 27, 2018

(65) Prior Publication Data

US 2019/0266438 A1 Aug. 29, 2019

(51) Int. Cl.
*G06K 9/62* (2006.01)
*G06T 11/60* (2006.01)

(52) U.S. Cl.
CPC ......... *G06K 9/6203* (2013.01); *G06K 9/6212* (2013.01); *G06T 11/60* (2013.01)

(58) Field of Classification Search
CPC .... G06K 9/6203; G06K 9/6212; G06T 11/60; G06T 5/005
See application file for complete search history.

(56) References Cited

U.S. PATENT DOCUMENTS

| | | |
|---|---|---|
| 9,554,133 B2 | 1/2017 | Ye et al. |
| 9,710,898 B2 | 7/2017 | Amirghodsi et al. |
| 2008/0152225 A1 | 6/2008 | Iwamoto |
| 2010/0104158 A1 | 4/2010 | Shechtman et al. |
| 2012/0088981 A1 | 4/2012 | Liu et al. |
| 2012/0155766 A1* | 6/2012 | Zhang .................. G06F 16/5838 382/173 |
| 2012/0230591 A1* | 9/2012 | Shibata ................ H04N 1/4097 382/195 |
| 2013/0121417 A1 | 5/2013 | Chong et al. |

(Continued)

FOREIGN PATENT DOCUMENTS

EP 2209090 A1 7/2010

OTHER PUBLICATIONS

Barnes, C., Shechtman, E., Finkelstein, A., and Goldman, D. B. Aug. 2009. Patchmatch: A randomized correspondence algorithm for structural image editing. In ACM SIGGRAPH 2009 Papers, ACM, New York, NY, USA, SIGGRAPH '09, 24:1-24:11.

(Continued)

*Primary Examiner* — John W Lee
(74) *Attorney, Agent, or Firm* — Keller Jolley Preece

(57) ABSTRACT

The present disclosure is directed toward systems, methods, and non-transitory computer readable media for generating a modified digital image by identifying patch matches within a digital image utilizing a Gaussian mixture model. For example, the systems described herein can identify sample patches and corresponding matching portions within a digital image. The systems can also identify transformations between the sample patches and the corresponding matching portions. Based on the transformations, the systems can generate a Gaussian mixture model, and the systems can modify a digital image by replacing a target region with target matching portions identified in accordance with the Gaussian mixture model.

20 Claims, 11 Drawing Sheets

(56) References Cited

U.S. PATENT DOCUMENTS

| | | |
|---|---|---|
| 2014/0161362 A1 | 6/2014 | Cao et al. |
| 2014/0205186 A1 | 7/2014 | Cao et al. |
| 2016/0042516 A1* | 2/2016 | Tieu .................... G06K 9/4671 382/124 |
| 2016/0100191 A1 | 4/2016 | Mishra et al. |
| 2017/0039723 A1 | 2/2017 | Price et al. |
| 2018/0121754 A1 | 5/2018 | Carr et al. |
| 2019/0042875 A1 | 2/2019 | Carr et al. |

OTHER PUBLICATIONS

Barnes, C., Shechtman, E., Goldman, D. B., and Finkelstein, A. Sep. 2010. The generalized PatchMatch correspondence algorithm. In European Conference on Computer Vision.

Barnes, C., Zhang, F.-L., Lou, L., Wu, X., and Hu, S.-M. Aug. 2015. Patchtable: Effcient patch queries for large datasets and applications. In ACM Transactions on Graphics (Proc. SIGGRAPH).

Liu, Siying, et al. "PatchMatch—based automatic lattice detection for near-regular textures." Proceedings of the IEEE International Conference on Computer Vision. 2015.

Li, Yu, et al. "Spm-bp: Sped-up patchmatch belief propagation for continuous mrfs." Proceedings of the IEEE International Conference on Computer Vision. 2015.

Muller, Oliver, Michael Ying Yang, and Bodo Rosenhahn. "Slice sampling particle belief propagation." Proceedings of the IEEE International Conference on Computer Vision. 2013.

Search Report as received in GB 1711706.0 dated Jan. 15, 2018.
U.S. Appl. No. 15/342,793, Jul. 3, 2018, Notice of Allowance.
U.S. Appl. No. 15/342,793, Jan. 11, 2019, Office Action.
U.S. Appl. No. 16/148,166, Jan. 11, 2019, Office Action.
U.S. Appl. No. 15/342,793, Sep. 16, 2019, Notice of Allowance.
U.S. Appl. No. 16/148,166, Sep. 11, 2019, Notice of Allowance.
U.S. Appl. No. 16/363,839, Apr. 22, 2020, Notice of Allowance.

* cited by examiner

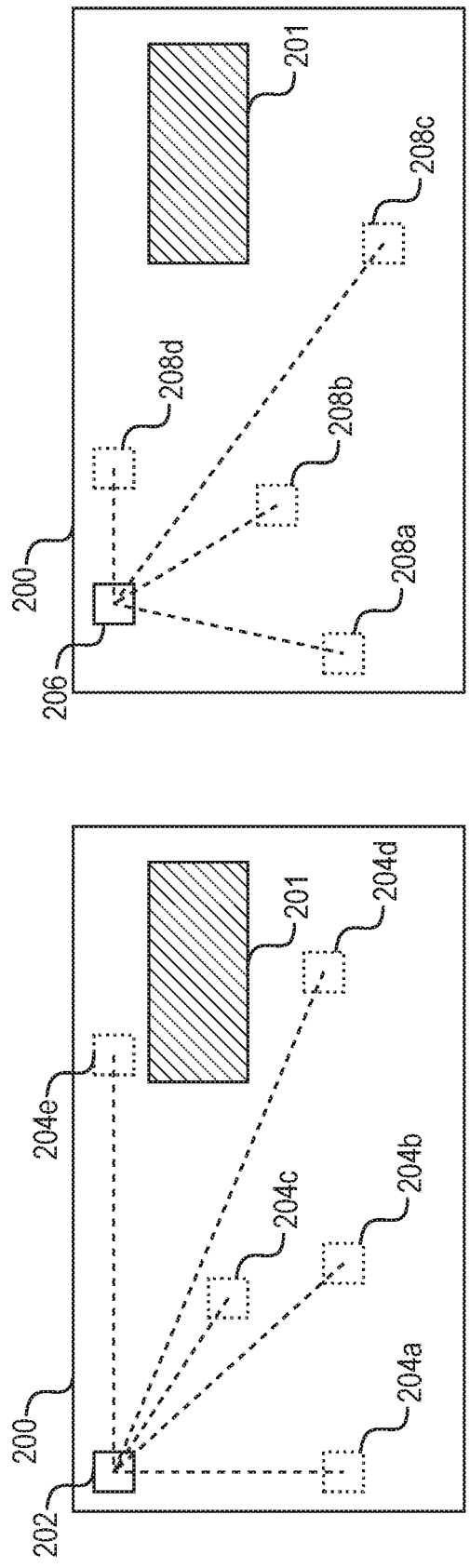

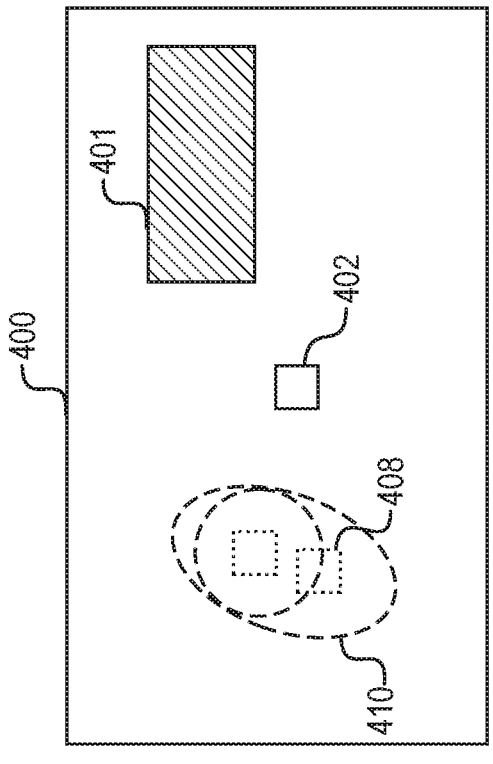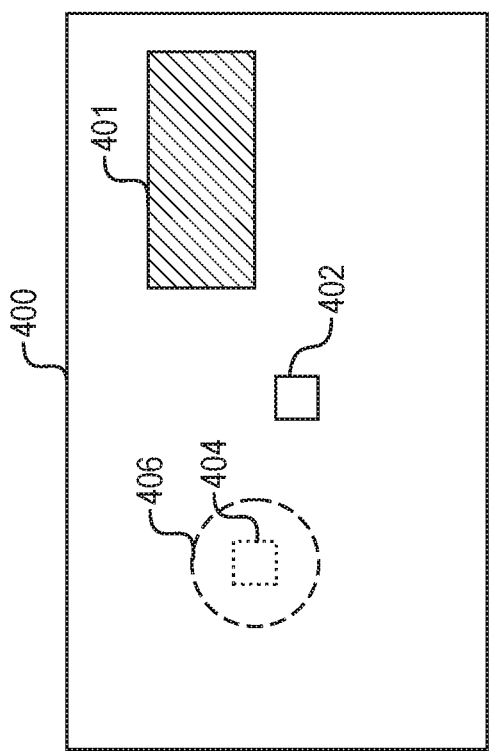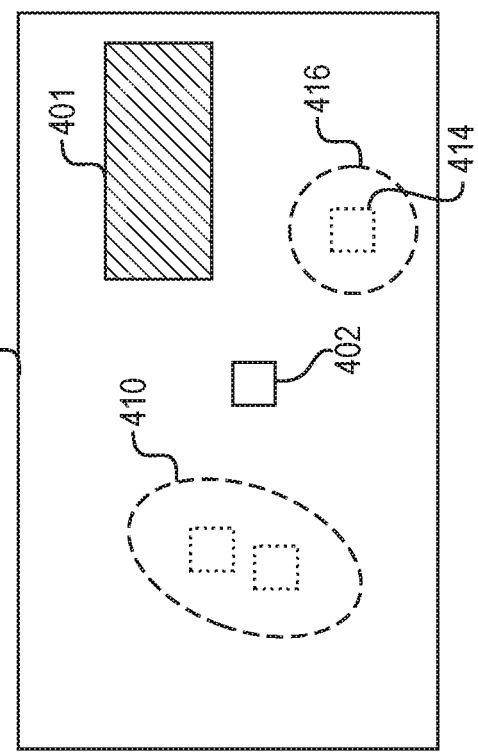
Fig. 4A
Fig. 4B
Fig. 4C

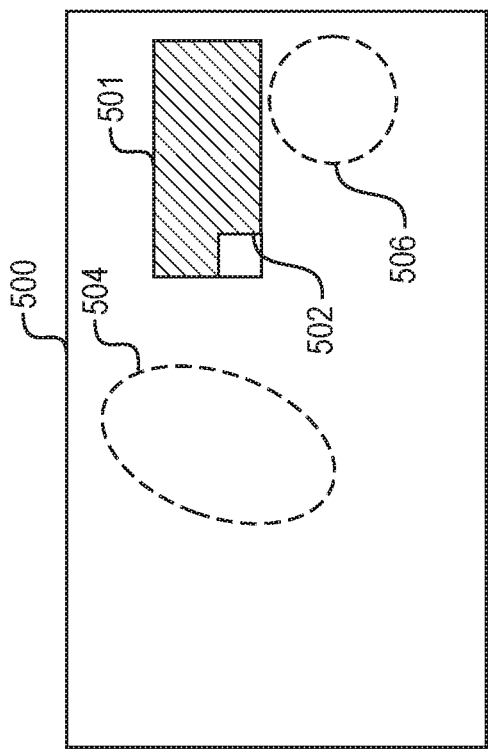
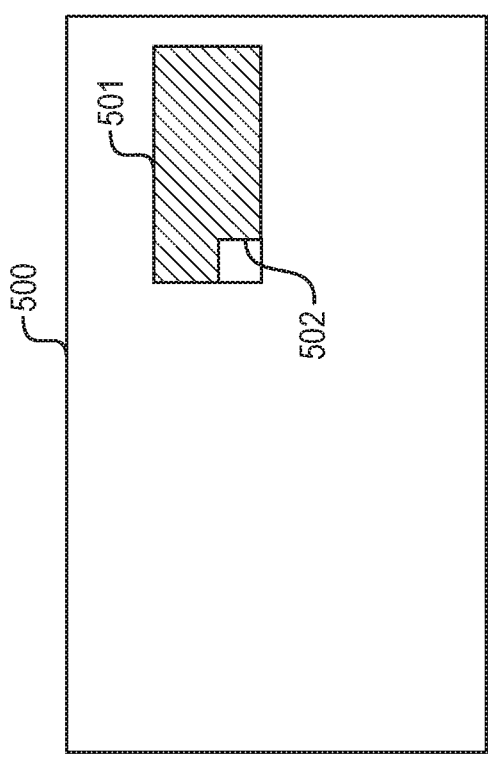
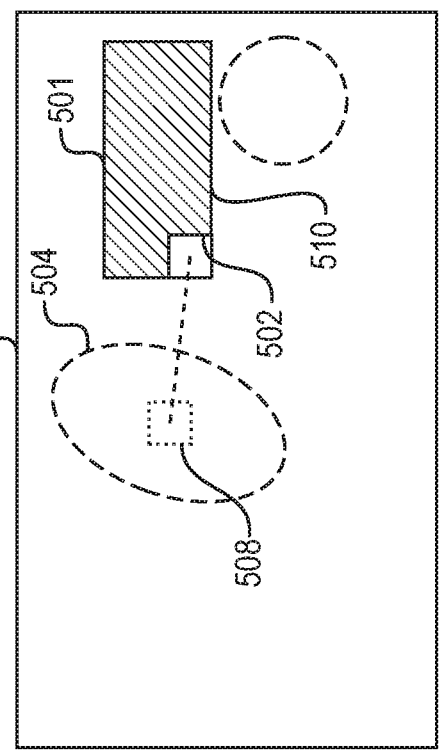
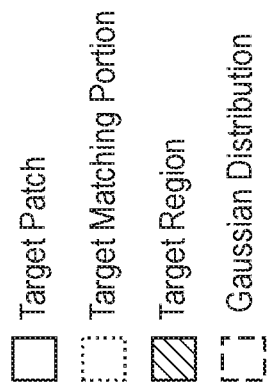

GENERATING MODIFIED DIGITAL IMAGES BY IDENTIFYING DIGITAL IMAGE PATCH MATCHES UTILIZING A GAUSSIAN MIXTURE MODEL

BACKGROUND

Advancements in computing devices and digital image editing technology have led to a variety of innovations in providing tools for users to manage and edit digital images. For example, digital image editing systems are now able to analyze a digital image to identify patch matches within the digital image. Based on this analysis, modern digital image editing systems are also able to modify the digital image by filling a particular region of the digital image based on the identified patch matches.

Despite these advances however, conventional digital image editing systems continue to suffer from a number of disadvantages. For instance, while conventional digital image editing systems can identify patch matches, these systems often require large amounts of computer memory and other computing resources. To illustrate, some conventional digital image editing systems operate using a binning (sometimes referred to as "bucketing") method whereby the system groups digital image data into bins for each image patch. The amount of memory required to store and analyze the information for all of the bins for every image makes conventional digital image editing systems highly demanding on computer processing power.

In addition, conventional digital image editing systems are often slow. More specifically, conventional digital image editing systems can identify patch matches, but these systems require long periods of time to analyze digital images and draw relationships between image patches on a very granular basis. Thus, these systems not only require extensive computing power but also require a long time to achieve operable results.

Moreover, many conventional digital image editing systems are inflexible. For example, conventional systems often only identify patch matches in relation to translation from one location to another within a digital image. Many conventional systems cannot analyze multiple different types of transformations because binning resolution becomes too sparse (and binning data too large) to support such higher-dimensionality analysis. Furthermore, binning approaches are also inflexible in that they fail to capture interactions and correlations between bins.

Furthermore, many conventional digital image editing systems are not very accurate. To illustrate, these systems often produce patch matches that do not seamlessly replace target regions within a digital image. Accordingly, conventional digital image editing systems are often ineffective at convincingly modifying digital images to correct inconsistencies, remove artifacts, etc., because the patch matches that the systems use to modify the image do not accurately reflect visual patterns within the digital image.

Thus, there are several disadvantages with regard to conventional digital image editing systems.

SUMMARY

One or more embodiments described herein provide benefits and solve one or more of the foregoing or other problems in the art by providing systems, methods, and non-transitory computer readable media that quickly and efficiently generate modified digital images by identifying a digital image patch match using a Gaussian mixture model. For instance, the disclosed systems can utilize a Gaussian mixture model to identify patch matches for filling holes, covering blemishes, or otherwise modifying target regions of a digital image. Specifically, the disclosed systems can generate a Gaussian mixture model that reflects a probability distribution of visual patterns within a digital image. Moreover, the disclosed systems can utilize the Gaussian mixture model to identify target matching portions for a target region and generate a modified digital image.

To illustrate, in one or more embodiments, the disclosed systems identify, within a digital image, a number of sample patches and corresponding matching portions of the digital image. The systems can further identify transformations between the sample patches and their respective matching image portions. Based on these transformations (e.g., relative translational, rotational, scalar, and/or reflectional relationships) between sample patches and corresponding matching portions, the disclosed systems can generate a Gaussian mixture model by generating a plurality of Gaussian distributions that collectively reflect the transformations between the plurality of sample patches and the corresponding matching portions. To generate the Gaussian mixture model comprised of Gaussian distributions, the systems can perform an analysis relative to each sample patch of the digital image to determine a probability of whether a given sample patch corresponds to an existing Gaussian distribution or a new Gaussian distribution within the Gaussian mixture model.

Utilizing the Gaussian mixture model, the systems can identify, for a target region of the digital image, a target matching portion to replace the target region. To correct a hole within the digital image, for example, the systems can identify a target region of the digital image (i.e., the hole), utilize the Gaussian mixture model to sample target matching portions of the digital image for the hole, and replace the hole with the target matching portions to generate a modified digital image.

The disclosed systems, methods, and non-transitory computer-readable media enjoy several advantages over conventional digital image analysis systems. For example, because the disclosed systems utilize a compact Gaussian mixture model that defines probability-based transformations within a digital image, the systems require significantly less memory than binning data of conventional systems. Furthermore, by utilizing a compact Gaussian mixture model to guide a search for target matching portions of a target region, the disclosed systems can generate modified digital images faster than conventional digital image analysis systems. Moreover, the disclosed systems are more flexible in that they can seamlessly scale to higher search space dimensions reflecting multiple different transformations (translation, rotation, scaling, reflection, etc). Additionally, using a Gaussian mixture model makes the disclosed systems more accurate, more robust to noise, and more precise due to a lack of quantization effects.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 2A-2B illustrate a series of digital images for identifying sample patches and corresponding matching portions in accordance with one or more embodiments;

FIGS. 4A-4C illustrate generating a Gaussian mixture model for a digital image in accordance with one or more embodiments;

FIGS. 5A-5C illustrate generating a modified digital image by replacing a target region utilizing a Gaussian mixture model in accordance with one or more embodiments;

DETAILED DESCRIPTION

Figure 1:
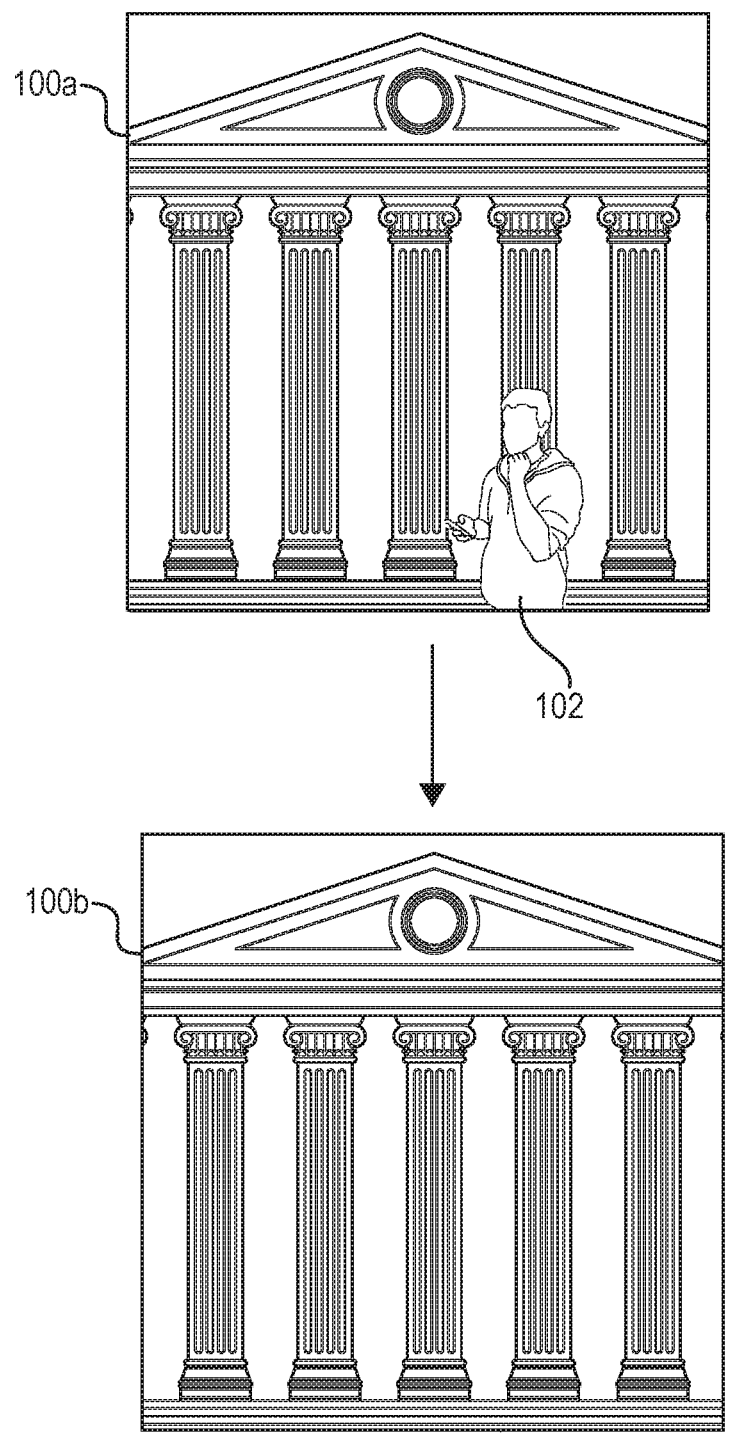
FIG. 1 illustrates an example sequence of modifying a digital image in accordance with one or more embodiments.

One or more embodiments described herein provide benefits and solve one or more of the foregoing or other problems in the art with a patch match system that generates a modified digital image by identifying digital image patch matches for a target region utilizing a Gaussian mixture model. In particular, in one or more embodiments, the patch match system can fill a target region (e.g., a hole or blemish in a digital image) with target matching portions by generating and utilizing a Gaussian mixture model reflecting visual patterns outside of the target region. For instance, in one or more embodiments, the patch match system identifies a plurality of sample transformations between sample patches and matching portions within the digital image, analyzes the samples to generate a Gaussian mixture model, and then utilizes the Gaussian mixture model to sample target matching portions for a target region. The patch match system can then utilize the target matching portions to modify the target region of the digital image.

To illustrate, in one or more embodiments, the patch match system identifies a plurality of sample patches within a digital image and corresponding matching portions of the digital image. The patch match system also identifies transformations between the sample patches and the corresponding matching portions. Based on these transformations, the patch match system generates a Gaussian mixture model by generating a plurality of Gaussian distributions that collectively reflect the transformations between the sample patches and the corresponding matching portions (e.g., utilizing a Dirichlet process). The patch match system can then identify a target region of the digital image (e.g., a hole or blemish) and sample the digital image in accordance with the generated Gaussian mixture model to identify a target matching portion within the digital image for the target region. The patch match system can then modify the digital image by replacing the target region with the target matching portion.

As just mentioned, in one or more embodiments the patch match system analyzes the digital image to identify sample patches (e.g., areas comprised of one or more pixels) of the image and corresponding matching portions. In some embodiments, the patch match system probabilistically samples (e.g., samples according to a given probability function) the digital image to identify sample patches, and then probabilistically samples the digital image to identify potential corresponding matching portions for the sample patches. The patch match system identifies matching portions of the digital image that correspond with the sample patches by comparing the sample patches with the sampled potential matching portions of the digital image. For a given sample patch, the patch match system can iteratively compare each potential matching portion to determine, for example, which portions are within a threshold similarity of the sample patch.

As mentioned, the patch match system can also identify transformations between the plurality of sample patches and the corresponding matching portions. For example, the patch match system can generate correspondence vectors that define the transformations between the plurality of sample patches and the corresponding matching portions of the digital image. Any particular transformation can include a variety of transformation types, for example, translation, rotation, scaling, and reflection.

As previously discussed, the patch match system can generate a Gaussian mixture model based on the transformations between the sample patches and the corresponding matching portions. To illustrate, the Gaussian mixture model can be represented by a probability density map for a digital image that indicates how to transform sample patches within the digital image to matching portions of the digital image. The Gaussian distribution can have multiple dimensions to account for different transformation types.

The patch match system can generate the Gaussian mixture model by analyzing each sample and determining whether the sample belongs to an existing Gaussian distribution or warrants a new Gaussian distribution. For example, in one or more embodiments, the patch match system utilizes a Dirichlet process to generate the Gaussian mixture model. Specifically, the patch match system can determine, for each of the plurality of sample patches, a first probability that a given sample transformation corresponds to an existing Gaussian distribution, and a second probability that that the sample transformation corresponds to a new Gaussian distribution. Based on these probabilities, the patch match system determines whether to assign the sample transformation to an existing Gaussian distribution or to generate a new Gaussian distribution to fit to the transformation.

As also mentioned, the patch match system modifies the digital image by replacing a target region of the digital image with a target matching portion. To identify the target matching portion, the patch match system samples the digital image in accordance with the Gaussian mixture model. For instance, the patch match system can select a transformation that corresponds to a peak of the Gaussian mixture model and apply the selected transformation to the target region to identify a target matching portion of the digital image. Upon identifying a target matching portion, the patch match system can utilize the target matching portion to modify the digital image (e.g., fill the target region if the target matching portion satisfies a threshold similarity in relation to neighboring pixels).

The patch match system provides several advantages over conventional digital image editing systems. For example, the patch match system requires less processing power and memory than conventional digital image analysis systems. For instance, whereas many conventional systems require large amounts of processing power to store and analyze bins in relation to each patch of a digital image, the patch match system defines and analyzes the relationships between sample patches and matching portions of the digital image using Gaussian distributions (e.g., distributions that can be defined with very little data). Thus, the patch match system consumes less memory to store and analyze transformations (e.g., patterns) between sample patches and corresponding matching portions. Indeed, because the patch match system generates a Gaussian mixture model for a given digital image, the patch match system relies on an analysis model that is based on the intrinsic features of the image itself, not the resolution of bins.

The patch match system further performs faster than conventional digital image analysis systems. For example, by utilizing a Gaussian mixture model to define the transformations between sample patches and corresponding matching portions of a digital image, the patch match system more quickly identifies target matching portions for target regions. Accordingly, the patch match system can modify a digital image more quickly than many conventional digital image analysis systems. Indeed, the patch match system can perform faster and more efficiently even than systems that implement neural networks (e.g., neural networks without a Gaussian mixture model that require significant storage of nodes and layers and significantly more training data and time).

In addition, the patch match system is more flexible than conventional systems. For instance, in one or more embodiments, the patch match system can scale to higher dimensions than conventional systems to consider multiple transformation types such as translation, rotation, scaling, reflection, etc., whereas many conventional systems only work for two-dimensional correspondence. Furthermore, the disclosed systems can determine information on the shape of modes for each Gaussian distribution (e.g., covariance matrices for each Gaussian), which indicates more meaningful image features from a multi-pixel scale to a sub-pixel scale. Conventional digital image analysis systems, in contrast, only provide information describing relationships of bins and sample pixels, but do not provide a correlation across different bins.

As another advantage, the patch match system is more accurate than conventional digital image analysis systems. In particular, the patch match system is more robust to noise because, by using a Gaussian mixture model, the patch match system considers probabilities across a digital image. Accordingly, the patch match system is not skewed by outlier data or quantization. Similarly, the patch match system is more precise because the Gaussian mixture model can reflect a continuous probability density function rather than an imprecise quantization of bins or histograms that is highly dependent on bin resolution.

As another illustration of how the patch match system is more accurate (and flexible) than conventional digital image analysis systems, the patch match system provides better interpolation and ergodicity than conventional systems. To illustrate, the patch match system can implement a Gaussian mixture model which flexibly and accurately considers a probability density across a digital image, as opposed to conventional systems which often only use several peaks of a histogram (and therefore ignore off-peak areas that may contain relevant matches). Furthermore, as outlined in greater detail below, in some embodiments the patch match system can also flexibly focus or broaden sampling of a Gaussian mixture model for different use cases.

In sum, the disclosed systems can utilize a Gaussian mixture model that is resolution independent, with closed-form evaluation and sampling that scales well for high-dimensional transformation models and improves both quality and efficiency in generating modified digital images.

As illustrated by the foregoing discussion, the present disclosure utilizes a variety of terms to described features and benefits of the patch match system. Additional detail is now provided regarding the meaning of these terms. For example, as used herein, the term "digital image" refers to a digital visual representation or depiction. For example, a digital image can refer to a group of pixels that each have a color value (e.g., RGB, HSV, YUV, etc.) forming an image. A digital image can refer to a digital photograph, thumbnail, or other image and can have any of a variety of formats such as JPG, BMP, GIF, PNG, and TIFF, among others. A digital image can comprise a portion of a digital video and can also include a two-dimensional or three-dimensional visual representation.

As mentioned above, the patch match system can modify a digital image to replace a target region within the digital image with a matching target portion. As used herein, a "target region" refers to an area within a digital image that is to be modified (e.g., removed, filled, changed, edited, etc.). A target region can be uniform in shape (e.g., square or circular) or else can be irregular in shape, and can include one or more pixels of the digital image. In particular, a target region can be user-specified where the patch match system receives user input to select (e.g., outline or highlight) an area of a digital image that the user wishes to modify. Alternatively, the patch match system can identify a target region based on analysis of the digital image to identify areas that are inconsistent with the remainder of the digital image. For example, a user may wish to remove an individual in the background of a digital photograph. The patch match system may therefore select the outline of the individual as the target region to remove from—or replace within—the digital image. Alternatively, a target region can refer to a subset of pixels (i.e. a target patch) within an area defined by the user or the patch match system. Indeed, to modify a digital image, the patch match system may replace many small areas (also called target patches) that make up a single larger target region of the digital image.

As also mentioned, in one or more embodiments the patch match system analyzes a digital image to identify sample patches within the digital image. As used herein, the term "sample patch" (or sometimes simply "patch") refers to an area of a digital image that the patch match system matches with other areas of the same image. A sample patch can be one or more pixels in size, and can be regular or irregular in shape. To illustrate, a sample patch can be a seven-by-seven pixel square within a digital image that the patch match system uses to compare with other pixels (e.g., other 7×7 pixels) of the digital image.

In analyzing the digital image, the patch match system further identifies matching portions of the digital image that correspond to the sample patches. As used herein, the term "matching portion" refers to an area of a digital image corresponding to a sample patch. More particularly, the term matching portion refers to an area of a digital image that the patch match system identifies as matching a sample patch or target region. Specifically, the term "matching portion" includes an area of a digital image that satisfies a threshold similarity relative to a sample patch. For instance, for the matching portion to correspond with the sample patch, the patch match system may compare the matching portion with the sample patch to determine that the matching portion is within a threshold similarity of the sample patch.

Additionally, the term "target matching portion" refers to an area of the digital image that the patch match system identifies in relation to a target region. In particular, a target matching portion may include an area of a digital image that corresponds to a target region (or target patch) defined within the digital image (e.g., satisfies a threshold similarity to neighboring pixels of the target region). Additionally, the patch match system may identify a target matching portion by comparing the target matching portion with neighboring pixels surrounding the target patch. The patch match system may further replace the target region (or target patch) with the target matching portion.

As mentioned, the patch match system identifies a transformation between a sample patch and a corresponding matching portion of a digital image. As used herein, the term "transformation" refers to a relative correspondence or relationship between one part of a digital image and another. A transformation can be defined by a "correspondence vector" that indicates how to transform one part of an image to another part of the image. For example, a transformation can refer to an operation that the patch match system can perform to a sample patch to match a different portion of the digital image. Such transformations can include, but are not necessarily limited to translation, rotation, scaling, and reflection. "Translation" refers to movement in two dimensions (e.g., within an x-y coordinate plane that includes the surface of a digital image). "Rotation" refers to manipulating a patch or portion of an image angularly. For example, rotation can refer to rotating around a normal axis. Similarly, in relation to three-dimensional digital images, the patch match system can rotate a patch of an image about a horizontal axis, a vertical axis, or some other axis to match a corresponding portion. "Scaling" refers to increasing or decreasing the size of an image patch or portion. "Reflection" refers to flipping an image patch or portion about an axis to see a reverse of the image patch or portion (e.g., modifying chirality).

As mentioned, the patch match system generates a Gaussian mixture model based on the transformations between the sample patches and the corresponding matching portions. As used herein, the term "Gaussian mixture model" refers to a convex combination of a number of Gaussian distributions. For example, a Gaussian mixture model can refer to a model to represent transformations (e.g., patterns) within an overall digital image utilizing a plurality of Gaussian (e.g., normal, frequently anisotropic) distributions. In addition, a Gaussian distribution can be multivariate to allow for capturing two-dimensional data such as translation, and to further allow for capturing data in higher dimensions (e.g., five-dimensional data corresponding to five transformation types). More particularly, a Gaussian distribution can refer to a depiction of normally distributed data such as transformations between sample patches and their corresponding matching portions within a digital image.

More detail regarding the patch match system will now be provided with reference to the figures. For example, FIG. 1 illustrates an input digital image 100a and an output digital image 100b in accordance with one or more embodiments disclosed herein. An exemplary implementation of the patch match system is described in relation to FIG. 1. Thereafter, a more detailed description of the components and processes of the patch match system is provided in relation to the subsequent figures.

As described above, the patch match system can revise holes, blemishes, errors, or other target regions of a digital image to generate a modified digital image. In relation to FIG. 1, the patch match system analyzes the input digital image 100a and produces the output digital image 100b. Indeed, the patch match system removes the individual 102 seen in the input digital image 100a from the digital image so that the output digital image 100b appears seamless, even after removing the individual 102. To produce the output digital image 100b, the patch match system analyzes the input digital image 100a, generates a Gaussian mixture model, identifies a target region (i.e., the individual 102), identifies one or more target matching portions using the Gaussian mixture model, and replaces the target region with the one or more target matching portions.

As just mentioned, the patch match system identifies a target region of the input digital image 100a to replace with a target matching portion. For instance, the patch match system may receive user input to outline the portrayal of the individual 102 within the input digital image 100a, and may therefore identify the individual 102 as the target region of the input digital image 100a. In one or more embodiments, the patch match system can automatically identify the individual 102 (e.g., the outline of the individual 102) utilizing a classifier, graph cut algorithm, and/or trained machine learning model.

To replace the target region (e.g., the individual 102) within the input digital image 100a, the patch match system generates a Gaussian mixture model. In particular, the patch match system can identify sample patches throughout the input digital image 100a (i.e., from areas outside of the target region), identify matching portions that correspond to the sample patches, and determine transformations between the sample patches and matching portions. The patch match system can then build a Gaussian mixture model that reflects the transformations between the sample patches of the input digital image 100a and the corresponding matching portions of the input digital image 100a.

Upon generating the Gaussian mixture model, the patch match system can then use the Gaussian mixture model as a map to guide the patch match system in identifying those image portions to use in replacing a target region. For example, the patch match system can sample the input digital image 100a according to the Gaussian mixture model to identify target matching portions for the target region. Indeed, in relation to FIG. 1, the patch match system replaces the target region where the individual's 102 head is located with target matching portions identified from the illustrated columns. Similarly, the patch match system replaces target regions where the individual's 102 shoulders and/or arms are located with target matching portions sampled from the spaces between the columns. Thus, the patch match system samples from a Gaussian mixture model to modify the input digital image 100a and generate the output digital image 100b.

As just discussed, the patch match system can identify sample patches, identify corresponding matching portions of the digital image, and determine transformations between the sample patches and the corresponding matching points. FIGS. 2A-2B illustrate determining transformations between sample patches and corresponding matching portions in accordance with one or more embodiments.

Specifically, FIGS. 2A-2B each illustrate the same digital image 200 that includes a target region 201. FIG. 2A illustrates a first sample patch 202 within the digital image 200, and further illustrates the patch matching system identifying corresponding matching portions 204a-204e. Thereafter, FIG. 2B illustrates the digital image 200 including a second sample patch 206 and corresponding matching portions 208a-208d.

In one or more embodiments, the patch match system utilizes a correspondence search approach. For example, the patch match system can stochastically analyze a digital image to select proposal portions and probabilistically determine whether or not to accept the proposal portions as matches to a sample patch. The patch match system can sample a digital image in a number of ways to identify sample patches. In some embodiments, to identify sample patches with a digital image, the patch match system randomly selects image patches within the digital image to identify as sample patches. In other embodiments, the patch match system implements a sampling algorithm that dictates how the patch match system samples a digital image—i.e., the sampling algorithm defines a pattern or probabilistic search sequence which the patch match system follows to identify sample patches of the digital image.

In addition to identifying sample patches, the patch match system also identifies matching portions of a digital image that correspond to the sample patches. In some embodiments, to identify matching portions that correspond to a given sample patch, the patch match system can utilize a probabilistic matching algorithm (e.g., a Markov Chain Monte Carlo algorithm). In particular, the patch match system follows the probabilistic matching algorithm to "walk" through the series of sample patches identified within a digital image to find corresponding matching portions for each sample patch. Indeed, the patch match system implements the probabilistic matching algorithm to test other portions of the digital image to identify those that match a given sample patch. In some embodiments, the patch match system generates a Markov chain (e.g., a stochastic model that describes a sequence of possible matches where each subsequent match depends in some degree on the previous match) whose values converge on a probability distribution of matching portions of a digital image. While this is one example, other correspondence search methods are also possible. For example, in some embodiments, the patch match system implements the patch match method described in U.S. patent application Ser. No. 15/342,793, which is incorporated by reference herein in its entirety.

FIG. 2A illustrates the digital image 200 including the target region 201. As shown, the patch match system identifies sample patch 202 within the digital image 200. To identify the sample patch 202, the patch match system probabilistically (e.g., randomly) samples the digital image 200—i.e., the patch match system samples the digital image 200 according to a probability function. While FIG. 2A illustrates the sample patch 202 in the upper-left corner of the digital image 200, this is merely illustrative, and the patch match system can identify a sample patch in any valid portion of the digital image 200.

The patch match system further analyzes the digital image 200 to identify portions of the digital image 200 that match the sample patch 202. To that end, the patch match system compares the sample patch 202 with other portions of the digital image 200. As mentioned, the patch match system can sample the digital image 200 randomly or in accordance with a sampling algorithm. For example, the patch match system can follow a sampling algorithm to identify sample patch 202 and to subsequently identify sample patch 206.

For the sample patch 202 of FIG. 2A, the patch match system also identifies the corresponding matching portions 204a-240e within the digital image 200. In particular, as mentioned above, the patch match system utilizes a matching algorithm to analyze different portions of the digital image 200 to determine whether those portions match the sample patch 202. In some embodiments, the patch match system identifies those portions of the digital image 200 that meet and/or exceed a matching threshold (e.g., a 70% match, a 90% match, etc.) as corresponding matching portions of the sample patch 202. In some embodiments, the patch match system determines a matching threshold with reference to a dissimilarity (e.g., a distance or error) function. For instance, the patch match system can calculate a matching threshold as the result of an error value less than some given number. In other embodiments, the patch match system identifies those portions that are within a similarity threshold of the sample patch 202 as corresponding matching portions. For example, the patch match system can compare the pixel values of the sample patch 202 with potential matching portions to determine that those portions whose pixel values are within a certain RGB (or HSV, sRGB, DCI-P3, or some other color space) range of the sample patch 202 are matching portions.

As illustrated in FIG. 2A, the patch match system analyzes the digital image 200 to identify corresponding matching portions 204a-204e located in different areas of the digital image 200. The patch match system determines that the corresponding matching portions 204a-204e are within a threshold similarity of the sample patch 202. For example, the patch match system can compare the pixel values of the sample patch 302 with values of the corresponding pixels of potential matching portions. To illustrate, the patch match system can compare a bottom-left pixel within the sample patch 302 with a bottom-left pixel of potential matching portions.

Through this comparison, the patch match system can identify those potential matching portions within the digital image 200 that are within a threshold similarity of the sample patch 202. For example, the patch match system can determine that a corresponding matching portion 204a has a threshold number of pixels that are within a threshold pixel value range of the corresponding pixels within the sample patch 202.

Upon identifying matching portions of the digital image 200, the patch match system can also determine a relative transformation between each sample patch and the corresponding matching portion. In particular, based on the location of the corresponding matching portions 204a-204e, the patch match system determines correspondence vectors that define relative transforms between the sample patch 202 and the corresponding matching portions 204a-204e. For example, the patch match system determines that the corresponding matching portion 204e is a horizontal translation of x pixels to the right and y pixels below the sample patch 202. Additional detail regarding determining the transformations between sample patches and corresponding matching portions is provided below with reference to FIGS. 3A-3D.

Although the foregoing example discusses translation, the patch match system can generate correspondence vectors to represent any type of transformation. As will be described in further detail below, the correspondence vector can be a high-dimensional vector to represent transformations such as translation, rotation, scaling, reflection, and/or others. As shown, the transformations between the sample patch 202 and each of the corresponding matching portions 204a-204e is represented by a dotted line.

In addition to the sample patch 202, the patch match system can also analyze other sample patches within the digital image 200. For instance, continuing to FIG. 2B, the patch match system identifies sample patch 206 from within the digital image 200. The patch match system further analyzes the digital image 200 to identify corresponding matching portions 208a-208d by, for example, comparing potential matching portions with the sample patch 206. Accordingly, the patch match system can identify the corresponding matching portions 208a-208d as matching the sample patch 206. Based on identifying the corresponding matching portions 208a-208d, the patch match system can further identify transformations between the sample patch 206 and each of the corresponding matching portions 208a-208d (e.g., as shown by the dotted lines of FIG. 2B).

While FIGS. 2A-2B illustrate two-dimensional translational transformations between sample patches and corresponding matching portions, additional or alternative transformations are possible. Indeed, the patch match system can identify rotational transformations between sample patches and corresponding matching portions, in addition to scaling transformations, reflection transformations, and other. For ease of illustration, however, the figures pertaining to this disclosure depict primarily translational transformations as they lend themselves more easily to drawing on a two-dimensional medium.

Figure 3A:
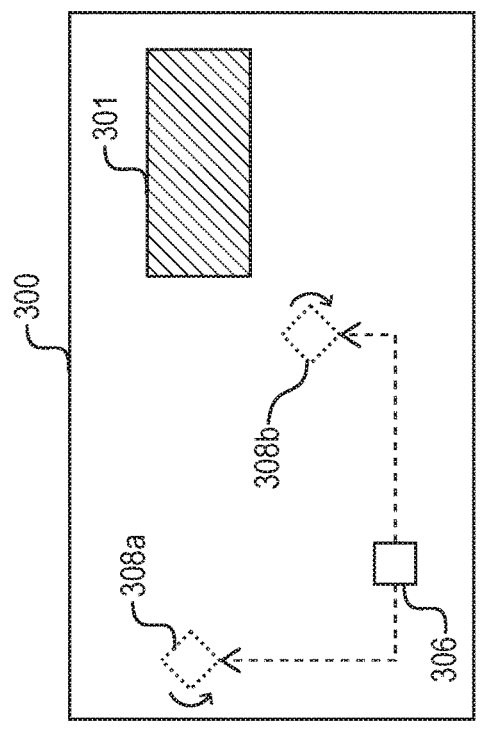
FIGS. 3A-3D illustrate a series of digital images for identifying transformations between sample patches and corresponding matching portions in accordance with one or more embodiments.
Figure 3B:
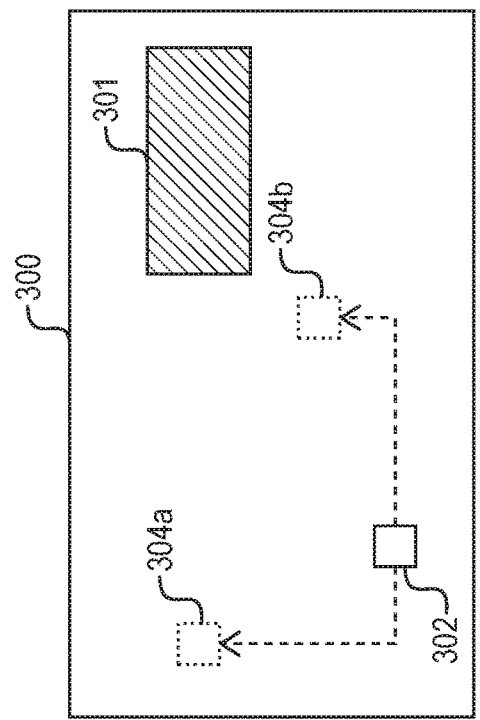
Figure 3C:
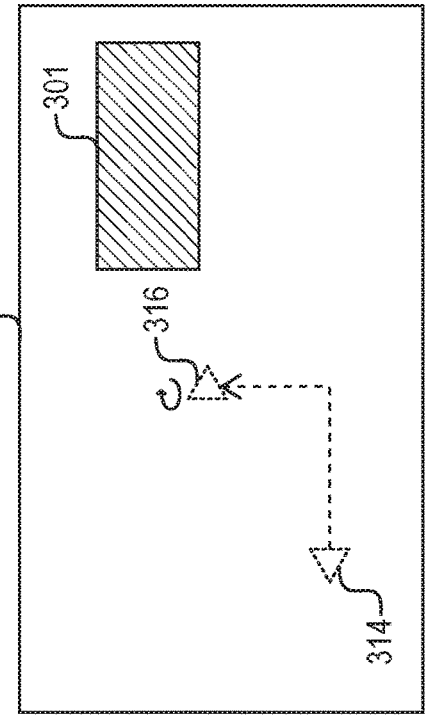
Figure 3D:
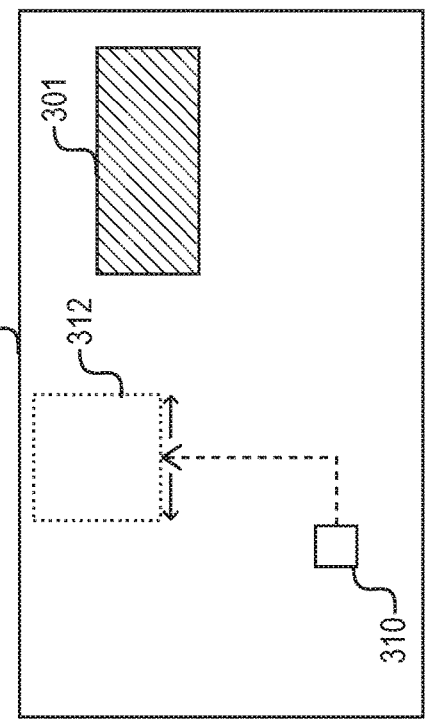

As mentioned, FIGS. 3A-3D illustrate various transformations between sample patches and corresponding matching portions. For example, FIG. 3A illustrates translation, FIG. 3B illustrates rotation, FIG. 3C illustrates scaling, and FIG. 3D illustrates reflection. Accordingly, FIGS. 3A-3D illustrate simplified versions of some of the transformation types that the patch match system can perform between sample patches and corresponding matching portions. Additional or alternative transformations than those illustrated in FIGS. 3A-3D are possible.

As mentioned, FIG. 3A illustrates a digital image 300 including a target region 301. FIG. 3A further illustrates a sample patch 302 and corresponding matching portions 304a-304b. Upon analyzing the digital image 300, including the sample patch 302 and/or the corresponding matching portions 304a-304b, the patch match system identifies a transformation between the sample patch 302 and the corresponding matching portions 304a-304b. As shown, the patch match system determines that the transformation between the sample patch 302 and the corresponding matching portion 304a is a two-dimensional translation in a direction to the left a certain distance (e.g., l pixels) and up a certain distance (e.g., u pixels). Accordingly, the patch match system defines a correspondence vector between the sample patch 302 and the corresponding matching portion 304a that represents the determined transformation (e.g., translation).

Similarly, the patch match system determines that the transformation between the sample patch 302 and the corresponding matching portion 304b is a translation to the right a certain distance (e.g., r pixels) and up a certain distance (e.g., p pixels). In addition, the patch match system generates a correspondence vector that represents the given transformation between the sample patch 302 and the corresponding matching portion 304b.

In some embodiments, the patch match system determines a translational transformation using a Cartesian coordinate system, while in other embodiments the patch match system uses a polar coordinate system. For example, the patch match system can determine a number of pixels or a distance in a horizontal direction between a sample patch and a corresponding matching portion, and can determine the same for a vertical direction as well. Alternatively, the patch match system can determine a direction (e.g., in degrees or radians) and a distance in that direction between a sample patch and a corresponding matching portion.

As illustrated in FIG. 3B, the patch match system can also identify rotational transformations. Indeed, the patch match system identifies sample patch 306 within the digital image 300, and further identifies corresponding matching portions 308a-308b. Furthermore, the patch match system determines transformations between the sample patch 306 and the corresponding matching portions 308a-308b. As shown in FIG. 3B, the transformations between the sample patch 306 and the corresponding matching portions 308a-308b include a translation component as well as a rotation component. Indeed, the patch match system can generate a multi-dimensional correspondence vector between sample patches to represent transformations that include translation, rotation, and other types of transformation.

More specifically, the patch match system can identify a rotation transformation between the sample patch 306, where the transformation includes a certain number of degrees or radians. In other words, the patch match system can determine that, to align the sample patch 306 with the corresponding matching portion 308a or 308b (or vice-versa), the patch match system needs to rotate the sample patch 306 (or the corresponding matching portion 308a or 308b) a certain amount in a given direction.

As illustrated in FIG. 3C, the patch match system can identify scaling transformations. To illustrate, the patch match system identifies the sample patch 310, the corresponding matching portion 312, as well as the transformation between the sample patch 310 and the corresponding matching portion 312. As shown in FIG. 3C, the transformation between the sample patch 310 and the corresponding matching portion 312 includes a translational component (e.g., to the right and up) as well as a scaling component (e.g., to increase the area of the sample patch 310 to match the area of the matching portion 312).

As shown, for the sample patch 310 to match the corresponding matching portion 312, the patch match system determines that the sample patch 310 must be increased in size. In particular, the patch match system determines that the sample patch must be scaled by a certain distance (e.g., a number of pixels in a horizontal, vertical, and/or diagonal direction) or by a certain percentage (e.g., a percentage of its overall area). Conversely, the patch match system may determine that, for the corresponding matching portion 312 to match the sample patch 310, the patch match system must decrease the size of the corresponding matching portion 312 by a certain distance or percentage. Whatever the method of scaling, the patch match system identifies a scaling transformation between the sample patch 310 and the corresponding matching portion 312.

As illustrated in FIG. 3D, the patch match system can also identify reflection transformations. The patch match system analyzes the digital image 300 to identify the sample patch 314 and the corresponding matching portion 316. Additionally, the patch match system identifies the transformation between the sample patch 314 and the corresponding matching portion 316. As shown, the patch match system identifies a transformation including a translational component (e.g., to the right and up) as well as a reflection component (e.g., a reflection about a vertical axis). Indeed, as illustrated in FIG. 3D, the triangle representing the sample patch 314 is a mirror image of the triangle representing the corresponding matching portion 316. This is merely illustrative, however, and the patch match system can identify a reflection transformation by swapping pixel values from one side of a sample patch with pixel values of another side of a sample patch. Additionally, the patch match system can reflect a sample patch about any possible axis such a horizontal axis, a vertical axis, or some other axis.

While FIGS. 3A-3D illustrate specific examples of translation, rotation, scaling, and reflection, additional or alternative transformations are also possible. For example, the patch match system can identify a scaling transformation where a matching portion that corresponds to a sample patch is smaller than the sample patch rather than larger. In addition, the patch match system can identify transformations that include not only translation, rotation, reflection, or scaling alone, but that can include two or more of the same.

FIGS. 3A-3D illustrate different transformations between sample patches and corresponding matching portions. As mentioned above, based on the identified transformations, the patch match system can generate correspondence vectors to represent the transformations between sample patches and corresponding matching portions. For example, the patch match system can generate an array of correspondence vectors where each correspondence vector reflects transformations between a sample patch and a matching portion. To illustrate, the patch match system can generate a array of correspondence vectors of the following form:

$$[v_1, v_2, v_3, \ldots, v_n]$$

where each of the vectors $v_1$-$v_n$ are multi-dimensional correspondence vectors that each reflect transformations between a sample patch and a corresponding matching portion. To illustrate, a correspondence vector can take the form:

$$v_1 = [x_1, y_1, r_1, s_1, m_1]$$

where $x_1$ is a horizontal translation metric between a patch match and matching portion, $y_1$ is a vertical translation metric between a patch match and matching portion, $r_1$ is a rotation metric between a patch match and matching portion, $s_1$ is a scaling metric between a patch match and matching portion, and $m_1$ is reflection (or mirroring) metric between a patch match and matching portion.

As mentioned, the patch match system generates a Gaussian mixture model based on identifying the sample patches, the corresponding matching portions, and their relative transformations (e.g., based on the correspondence vectors). In particular, the patch match system can utilize a Dirichlet process to generate a plurality of Gaussian distributions from the sample transformations (e.g., multi-dimensional correspondence vectors) between each sample patch and corresponding matching portion. For example, the patch match system can generate a number of Gaussian distributions that reflect transformations between sample patches and corresponding matching portions and that represent probabilities of identifying a matching portion by applying transformations to a sample patch in (or target region) in a digital image. Accordingly, the patch match system generates a Gaussian mixture model composed of the various Gaussian distributions and that collectively reflects probabilities for identifying matching regions by applying transformations across a digital image (e.g., reflect the probability of structural patterns across the digital image). To this end, FIGS. 4A-4C illustrate a process of generating a Gaussian mixture model in accordance with one or more embodiments.

In particular, FIGS. 4A-4C illustrate a digital image 400 including a target region 401. Additionally, considered together, FIGS. 4A-4C illustrate a sequence of generating a Gaussian mixture model utilizing a statistical analysis (e.g., Dirichlet process). However, while FIGS. 4A-4C illustrate generating Gaussian distributions within the image domain (i.e., on the digital image 400), this is merely illustrative. Indeed, in one or more embodiments, the patch match system generates the Gaussian mixture model within an offset space-a zero-centered (multi-dimensional) vector space which the patch match system can utilize to reflect various transformation types. Because of the difficulty of illustrating such a multi-dimensional offset space, FIGS. 4A-4C illustrate a translation transformation in the image domain. For example, FIG. 4A illustrates a sample patch 402 and a corresponding matching portion 404 in relation to the digital image 400. Based on identifying the corresponding matching portion 404, the patch match system generates a Gaussian distribution 406 in the x and y dimensions based on the transformation to the corresponding matching portion 404.

While FIG. 4A illustrates the Gaussian distribution 406 as a dotted circle (or ellipse or oval) only in a particular place within the digital image 400, this is merely illustrative, and the Gaussian distribution 406 is actually a probability distribution, with the areas of highest probability indicated by the dotted circle. In some embodiments, the dotted circle represents an area having at least a threshold probability (e.g., 70%, 80%, etc.) of containing a matching portion for the sample patch 402 by applying a transformation. In other embodiments, the dotted circle (or ellipse or oval) may be larger to represent an area with a lesser threshold probability, or else may be smaller to represent an area with a greater threshold probability. In sum, even though the Gaussian 406 is illustrated as a circle, it will be appreciated that the Gaussian 406 is actually a probability distribution function (within a multi-dimensional relative offset space) and the circle represents a particular value along the probability distribution function in the x, y plane in relation to the digital image 400.

To generate the Gaussian distribution 406, the patch match system determines a first probability that the transformation between the sample patch 402 and the corresponding matching portion 404 fit an existing Gaussian distribution and a second probability that the transformation between the sample patch 402 and the corresponding matching portion 404 fit a new Gaussian distribution. The patch match system can make a selection according the first probability and the second probability to assign a sample to either an existing Gaussian distribution or a new Gaussian distribution.

Initially, the patch match system determines that the probability that the transformation between the sample patch 402 and the corresponding matching portion 404 should be assigned to a new Gaussian distribution is very high (e.g., 100%) because there are not yet an existing Gaussian distributions to fit the transformation. Accordingly, the patch match system generates the Gaussian distribution 406 to fit the sample transformation between the sample patch 402 and the corresponding matching portion 404 (e.g., to fit the correspondence vector discussed above in relation to FIGS. 2A-2B). For instance, the patch match system centers the Gaussian distribution 406 around the transformation to the corresponding matching portion 404 to reflect an area of high probability of containing matching portions with respect to the sample patch 402.

The patch match system can thus analyze each sample transformation between sample patches and corresponding matching portions (e.g., analyze each correspondence vector) to modify existing Gaussians and/or generate additional Gaussians. For example, FIG. 4B illustrates adding a new sample to an existing Gaussian and modifying the Gaussian to reflect the new sample. Specifically, FIG. 4B shows the digital image 400 including the target region 401 and the sample patch 402. As illustrated in FIG. 4B, the patch match system analyzes a second matching portion 408. In particular, the patch match system analyzes the matching portion 408 and the transformation between the sample patch 402 and the corresponding matching portion 408 and determines a first probability that the transformation fits an existing Gaussian distribution (e.g., the Gaussian distribution 406) and a second probability that the transformation fits a new Gaussian distribution.

To patch match system can utilize the probabilities in a variety of ways to determine whether to generate a new Gaussian distribution or to fit the transformation to an existing Gaussian distribution. For example, the patch match system may compare the first probability and the second probability and, based on the comparison, may determine which probability is greater. If the first probability is greater, then the patch match system may fit the transformation to an existing Gaussian distribution. If the second probability is greater, then the patch match system may generate a new Gaussian distribution to fit the transformation. Alternatively, the patch match system may randomly or probabilistically determine whether to fit the transformation to an existing Gaussian distribution or to generate a new Gaussian distribution. For instance, if the patch match system determines that the probability that the transformation between the sample patch 402 and the corresponding matching portion 408 belongs to an existing Gaussian distribution is 70%, and the probability that the same transformation should be fit to a new Gaussian distribution is 30%, the patch match system may sample according to these probabilities in determining whether to fit the transformation to an existing Gaussian distribution or a new Gaussian distribution. Thus, the patch match system could determine to generate a new Gaussian distribution for a given transformation even if the probability is lower that the transformation should be fit to a new Gaussian distribution.

As shown in FIG. 4B, the patch match system determines that the transformation between the sample patch 402 and the corresponding matching portion 408 should be assigned to the existing Gaussian distribution 406. For illustrative purposes, FIG. 4B includes a dotted circle representing the original Gaussian distribution 406 of FIG. 4A and a second dotted ellipse illustrating a modified Gaussian distribution 410 to illustrate how the patch match system can adjust a Gaussian distribution to fit a new sample. Indeed, the patch match system can modify the Gaussian distribution 406 to include the corresponding matching portion 408 and generate the modified Gaussian distribution 410, thereby representing the transformations between the sample patch and each of the corresponding matching portions 406 and 408.

Indeed, as shown in FIG. 4B, the patch match system adjusts the Gaussian distribution 406 to generate the modified Gaussian distribution 410 that encompasses both the corresponding matching portions 404 and 408. For example, the patch match system may determine to not center either corresponding matching portion 404 or 408 at the peak of the Gaussian distribution 412 (i.e., the center) but may determine to include both portions where the peak is somewhere between them. Alternatively, the patch match system may center the Gaussian distribution 412 around one of the corresponding matching portions 404 or 408 while still fitting the other within the Gaussian distribution 412. Either way, the patch match system can adjust the Gaussian distribution 412 to fit additional corresponding matching portions.

As mentioned above, the patch match system can also add a new Gaussian distribution based on a sample transformation. In particular, FIG. 4C illustrates adding a new Gaussian based on a matching portion 414. In particular, the patch match system identifies the matching portion 414 as corresponding to (e.g., matching) the sample patch 402. In addition, the patch match system identifies a transformation between the sample patch 402 and the corresponding matching portion 414. Based on the identified transformation, the patch match system determines a first probability that the transformation belongs to the existing Gaussian distribution 412, and also determines a second probability that the transformation should be fit to a new Gaussian distribution. The first and second probabilities can be based on a super parameter that defines the likelihood of random events—i.e., the likelihood of a given transformation fitting an existing Gaussian distribution or belonging to a new Gaussian distribution.

As shown in FIG. 4C, the patch match system generates a new Gaussian distribution 416 to represent the transformation between the sample patch 402 and the corresponding matching portion 414. Indeed, the patch match system determines, based on the first probability and the second probability, that the transformation for the corresponding matching portion 414 should be assigned to a new Gaussian distribution. Therefore, the patch match system generates the new Gaussian distribution 416 to fit the corresponding matching portion 414. In this manner, the patch match system can iterate through all samples (e.g., all correspondence vectors) and generate a Gaussian mixture model comprising a plurality of Gaussian distributions that reflect a probability of transformations corresponding to matching portions for any given sample patch.

Upon generating all of the Gaussian distributions, the weights and parameters of each Gaussian distribution is refined with an expectation-maximization ("EM") algorithm. Generally, each Gaussian distribution is anisotropic with a covariance matrix representing its correlation between different dimensions. Additionally, the final number of Gaussian distributions is not predefined, but the patch match system generates a certain number of Gaussian distributions within the Gaussian mixture model based on the analysis of a given digital image. Consequently, the Gaussian mixture model can represent the clustering and density of all sample patches in a compact, and easily-evaluated form.

Although FIGS. 4A-4C illustrate generating a Gaussian mixture model for translation (e.g., in the x and y dimensions), the patch match system can also generate a Gaussian mixture model for other transformations (with additional Gaussian dimensions). Indeed, in one or more embodiments, the Gaussian mixture model utilizes the approach described in relation to FIGS. 4A-4C to generate Gaussians reflecting translation, rotation, scaling, and reflection. Indeed, in one or more embodiments, the number of dimensions for each Gaussian is the same as the number of transformation types (e.g., rotation, scaling, etc.). Moreover, as mentioned above, although FIGS. 4A-4C illustrate the Gaussian mixture model in an image domain, the patch match system generates the Gaussian mixture model in a relational, multi-dimensional space (i.e., a vector space centered on each sample with dimensions corresponding to each transformation type).

To illustrate, as described above, the patch match system can generate multi-dimensional correspondence vectors for each sample patch, where each dimension of the correspondence vector reflects a transformation type (e.g., x translation, rotation, scaling, etc.). The patch match system can analyze each correspondence vector and determine whether the correspondence vector belongs to a new multi-dimensional Gaussian (i.e., a new Gaussian with the same number of dimensions as the correspondence vector) or an existing multi-dimensional Gaussian (i.e., an existing Gaussian with the same number of dimensions as the correspondence vector). The patch match system can iterate through each correspondence vector and build a Gaussian mixture model that reflects the transformations in a plurality of dimensions.

In addition, although FIGS. 4A-4C illustrate generating particular Gaussian distributions, the patch match system can generate a Gaussian mixture model of any number, type, or shape of Gaussian distributions. Indeed, in one or more embodiments, the patch match system can adjust parameters (e.g., adjust parameters based on user input) to modify the focus (e.g., narrowness or breadth) of Gaussian distributions. To illustrate, the patch match system can modify parameters to generate a Gaussian distribution to be more focused with tighter "peaks." Similarly, the patch match system can modify parameters to generate Gaussian distributions that are not fit as tight to sample transformations, but are broader (thus resulting in a wider range). In this manner, the patch match system can allow for selection of target matching portions that tightly fit transformations learned from the digital image or that explore more broadly from the transformations reflected in other portions of the digital image.

As mentioned above, the patch match system can utilize a Gaussian mixture model to generate a modified digital image. In particular, the patch match system can utilize the Gaussian mixture model to identify target matching portions for a target region of a digital image. Thus, the patch match system can utilize the Gaussian mixture model as a probability-based representation of what transformations to perform with respect to searching for a target matching portion for a target region to modify a digital image.

Indeed, as discussed, to modify a digital image, the patch match system can replace a target region with target matching portions. For example, FIGS. 5A-5C illustrate identifying a target matching portion for a target region of a digital image utilizing a Gaussian mixture model and modifying the target region based on the target matching portion. Specifically, FIGS. 5A-5C illustrate a digital image 500 with a target region 501. As discussed above, the target region 501 may be a blemish, hole, or undesirable region that a user seeks to modify (e.g., replace, fill, etc.) The patch match system analyzes the digital image 500 in accordance with the disclosure herein to replace the target region 501 with target matching portions. More specifically, the patch match system identifies target patches within the target region 501 and, based on the generated Gaussian mixture model, identifies target matching portions that correspond with the target patches. In this way, the patch match system can identify target matching portions and replace the target patches that make up the target region 501.

As shown in FIG. 5A, the patch match system identifies the target region 501 within the digital image 500. For example, the patch match system receives user input to designate the target region 501. Such user input can include tracing or outlining a particular area within the digital image 500 by way of an input device such as a mouse, touchscreen, or keyboard. In other embodiments, the patch match system analyzes the digital image 500 to identify the target region 501 automatically (e.g., without user input) by identifying those areas of the image that are inconsistent with the digital image 500 as a whole. For example, the patch match system may determine that there are abrupt pixel value changes that trigger the patch match system to identify clipped areas, blurry areas, blank areas, or otherwise undesirable areas of the digital image 500.

Upon identifying the target region 501 within the digital image 500, the patch match system further identifies a target patch 502 within the target region 501. The target patch may include one or more pixels (e.g., a 7×7 pixel patch of the target region 501). In one or more embodiments, the patch match system identifies target patches by proceeding through the target region 501 in a particular order. For example, in relation to FIG. 5A, the patch match system begins by identifying a target patch in the lower right corner of the target region 501. Although FIG. 5A indicates a particular location of the target patch 502, the patch match system can begin in a different corner, in the middle of an edge, or at a different location of the target region 501. In other embodiments, the patch match system identifies target patches by probabilistically sampling target patches from the target region 501, rather than in any particular iterative order.

Upon identifying a target patch, the patch match system can then search for a target matching portion within the digital image 500. In particular, the patch match system may apply the Gaussian mixture model (e.g., the model generated above in relation to FIGS. 4A-4C) to identify target matching portions that correspond with the target patch 502. In particular, the patch match system may sample the digital image 500 from the target patch 502 utilizing the Gaussian mixture model to identify corresponding target matching portions.

In some embodiments, the patch match system samples a digital image to identify target matching portions by sampling across each Gaussian distribution within the Gaussian mixture model. In other embodiments, however, the patch match system can limit sampling for target matching portions to particular areas of each Gaussian distribution. For example, the patch match system can sample only from "peaks" of Gaussian distributions where the probability of finding a target matching portion satisfies a particular threshold (e.g., 70%, 80%, etc.), while refraining from sampling from areas indicated by the Gaussian distributions to have lower probability of finding a target matching portion. Alternatively, the patch match system can sample for target matching portions by sampling from areas having a particular range of probability of finding a target matching portion (e.g., between 70% and 90%, from 60% to 75%, etc.), as indicated by the Gaussian distributions.

Indeed, FIG. 5B, illustrates an exemplary Gaussian mixture model (in the x and y dimensions) superimposed on the digital image 500 in relation to the target patch 502 (e.g., the Gaussian mixture model generated by the process described above in relation to FIGS. 4A-4C). As shown, the Gaussian mixture model comprises two Gaussian distributions 504, 506 (e.g., the same Gaussian distributions 410 and 416 from FIG. 4C).

The patch match system applies the Gaussian mixture model relative to the target patch 502 to identify a target matching portion. Specifically, the patch match system takes a probabilistic sample from the Gaussian mixture model that indicates a transformation relative to the target patch 502 to identify a target matching portion. Indeed, as shown in FIG. 5C, the patch match system samples from the Gaussian distributions 504, 506 to identify a transformation applicable to the target patch 502 (e.g., to the left 20 pixels and up 4 pixels). By taking a sample from the Gaussian mixture model, the patch match system identifies a target matching portion (e.g., the target matching portion that is to the left 20 pixels and up 4 pixels relative to the target patch 502).

Upon identifying a target matching portion, the patch match system can also analyze the target matching portion 508 to ensure that it is a match for the target patch 502. For example, in one or more embodiments, the patch match system compares the target matching portion 508 to neighboring pixels of the target patch 502. For instance, the patch match system can compare the target matching portion 508 with the neighboring pixel(s) 510. To illustrate, the patch match system can generate a similarity score between the target matching portion 508 and the neighboring pixel(s) 510.

In one or more embodiments, the patch match system can determine that the target matching portion 508 is actually a match based on the comparison between the target matching portion 508 and the neighboring pixel(s) 510. For instance, the patch match system can compare the similarity score between the target matching portion 508 and the neighboring pixel(s) 510 to a similarity threshold. If the similarity score satisfies the similarity threshold, the patch match system can modify the target region 501 based on the target matching portion 508. Specifically, the patch match system can replace the target patch 502 with the target matching portion 508.

In this manner, the patch match system can seamlessly replace the target region 501. Indeed, the patch match system can iteratively identify target patches (e.g., identify a second target patch adjacent to the target patch 502), utilize the Gaussian mixture model to sample the digital image 500 for additional target matching portions, ensure that the target matching portions fit the target patch, and then replacing the target patches with the target matching portions. The patch match system can repeatedly replace target patches until filling the entire target region 501 with target matching portions from the digital image 500.

Although FIGS. 5B-5C illustrate identifying a single target matching portion for a patch match, in one or more embodiments, the patch match system can determine a plurality of target matching portions. For example, the patch match system can take multiple samples from the Gaussian mixture model and identify a plurality of target matching portions. The patch match system can compare the plurality of target matching portions to neighboring pixels of the target patch and select one of the target matching portions based on the comparison. For example, in one or more embodiments, the patch match system selects that target matching portion with the highest similarity score.

Similar to FIGS. 4A-4C, for ease of illustration FIGS. 5A-5C illustrate applying a Gaussian mixture model in relation to translation (in the x and y dimensions of an image domain). The patch match system can apply a Gaussian mixture model in relation to any variety of transformations. Indeed, as discussed above, the patch match system can generate the Gaussian mixture model in a relative, zero-centered vector space with different dimensions for different transformations. Thus, the Gaussian mixture model can be built on a translational space (or dimension), a rotational space (or dimension), a scalar space (or dimension), and/or some other transformational space. Accordingly, the patch match system can sample from a Gaussian mixture model that indicates translations, rotations, scaling, and/or mirroring. To illustrate, the patch match system can sample from a Gaussian mixture model to and identify a transformation that is 10 pixels to the right, 20 pixels up, rotated by 10 degrees, and scaled up by 50%. The patch match system can then identify a target matching portion based on the transformation and replace a target patch with the target matching portion. Thus, the patch match system can utilize a high-dimensional Gaussian mixture model (e.g., four-dimensional Gaussian or five-dimensional Gaussian) to select target matching portions utilizing a variety of different transformations.

This is significant because patterns reflected in digital images are not always translational. Indeed, a digital image can reflect a curved pattern (e.g., a circular dome with repeating, rotating patterns). Similarly, a digital image can reflect a pattern that varies based on scale (e.g., a row of cobblestones that decrease in size the closer they are to the horizon). The patch matching system can probabilistically model these patterns through the Gaussian mixture model to more accurately search for and identify target matching portions for a target region.

Moreover, as discussed above, Gaussian's are computationally inexpensive to generate, store, and apply. Accordingly, by generating a Gaussian mixture model, the patch match system can condense thousands (or millions) of multi-dimensional samples (e.g., multi-dimensional transformations between sample patches and matching portions) into an efficient Gaussian representation. The patch match system can then efficiently sample from the Gaussian mixture model to guide the search for target matching portions to replace a target region. Thus, the patch match system can quickly and efficiently identify target matching portions that seamlessly replace target regions and generate modified digital images. Conventional systems that utilize a binning approach in such high-dimension applications require significantly more processing power and storage.

Figure 6:
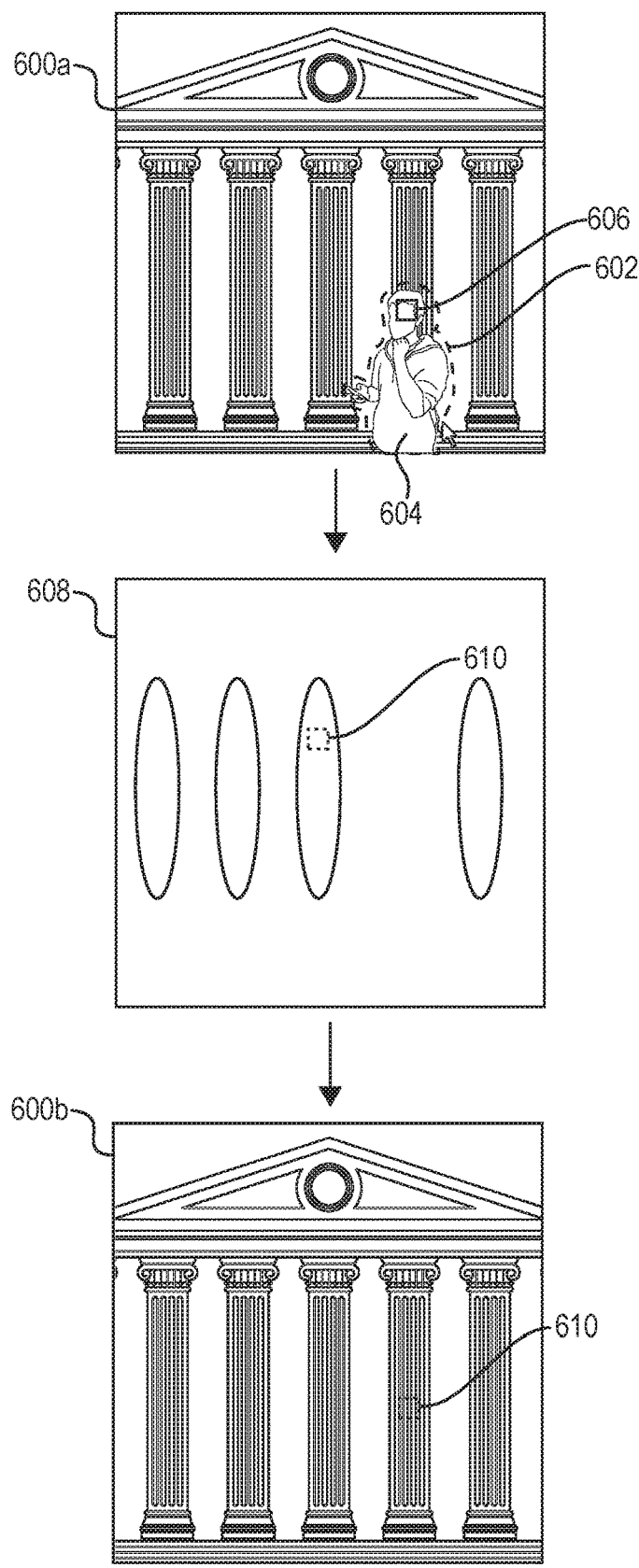
FIG. 6 illustrates a summary of generating a Gaussian mixture model and modifying a digital image in accordance with one or more embodiments.

To illustrate a summary of how the patch match system modifies a digital image in accordance with one or more embodiments, FIG. 6 illustrates an original digital image 600a (e.g., the input digital image 100a) that the patch match system analyzes to generate a modified digital image 600b (e.g., the output digital image 100b). In particular, the patch match system analyzes the digital image 600a to generate a Gaussian mixture model in accordance with the disclosure above. For instance, the patch match system identifies sample patches, corresponding matching portions, and transformations between the sample patches and the corresponding matching portions. The patch match system then utilizes a Dirichlet process to generate a plurality of Gaussian distributions that represent the transformations.

In addition to generating the Gaussian mixture model, the patch match system identifies a target region 602 within the digital image 600a. For example, the patch match system receives user input to outline the individual 604 within the digital image 600a. Accordingly, the patch match system identifies the target region 602 as a region of the original digital image 600a that the patch match system is to modify.

Within the target region 602, the patch match system identifies a target patch 606. The patch match system applies the Gaussian mixture model relative to the target patch 606. Indeed, FIG. 6 illustrates an exemplary representation of Gaussian mixture model 608 that the patch match system utilizes to identify a target matching portion that corresponds to the target patch 606. As illustrated, the Gaussian mixture model 608 comprises a number of different Gaussian distributions represented (e.g., the ovals of FIG. 6). Thus, as described above, the Gaussian mixture model 608 indicates probabilities of transformations relative to the target patch 606 that are likely to yield a corresponding target matching portion.

While the Gaussian mixture model 608 includes four Gaussian distributions each having a particular size, shape, and location, these distributions are merely illustrative. Indeed, the patch match system can generate a Gaussian mixture model based on original digital image 600a that includes more Gaussian distributions in different locations, with different shapes, etc. Generally speaking, however, the Gaussian mixture model 608 represents probabilities of location target matching portions for the target patch 606.

As mentioned above, the patch match system can identify a target matching portion for the target patch 606 by sampling from the Gaussian mixture model 608. In particular, the patch match system can randomly generate a sample in accordance with the Gaussian mixture model 608 to determine a target matching portion 610. As discussed, the patch match system can also analyze the target matching portion 610 to ensure that the target matching portion will fit the target patch 606. For example, the patch match system can compare the target matching portion 610 with pixels surrounding the target patch 606 to ensure that the target matching portion 610 satisfies a similarity threshold.

Upon identifying the target matching portion 610 for the target patch 606, the patch match system can further replace the target patch 606 with the corresponding target portion 610. Furthermore, the patch match system can repeat the process of identifying target patches, identifying corresponding target portions, and replacing the target patches with the corresponding target portions until the entirety of the target region 602 is replaced. Accordingly, as illustrated in FIG. 6, the patch match system generates the modified digital image 600b after the patch match system has replaced the target region 602 with corresponding target matching portions to appear seamless with the rest of the image.

Although FIG. 6 illustrates utilizing a Gaussian mixture model to modify a target region, the patch match system can utilize a Gaussian mixture model for other analysis. For example, in one or more embodiments, the patch match system can further utilize a Gaussian mixture model to perform a symmetry analysis. In particular, the patch match system can analyze one or more digital images in accordance with the disclosure herein to generate a Gaussian mixture model based on transformations between sample patches and corresponding matching portions to determine a symmetry of the one or more digital images. For example, the patch match system can determine a level of symmetry or a symmetry rating of a digital image (or between digital images) by analyzing Gaussian distributions reflecting patterns of the digital image (or patterns between the digital images). Alternatively, the patch match system can determine a binary decision of whether or not a given digital image is symmetrical (or multiple digital images are symmetrical or similar). For instance, the patch match system can determine whether a symmetry rating satisfies a symmetry threshold to determine whether or not a digital image is symmetrical. Such symmetry can include a Euclidean symmetry, a reflectional (or line) symmetry, a rotational symmetry, a translational symmetry, a glide reflection symmetry, a helical symmetry, a double rotational symmetry, and/or a non-isometric symmetry.

Figure 7:
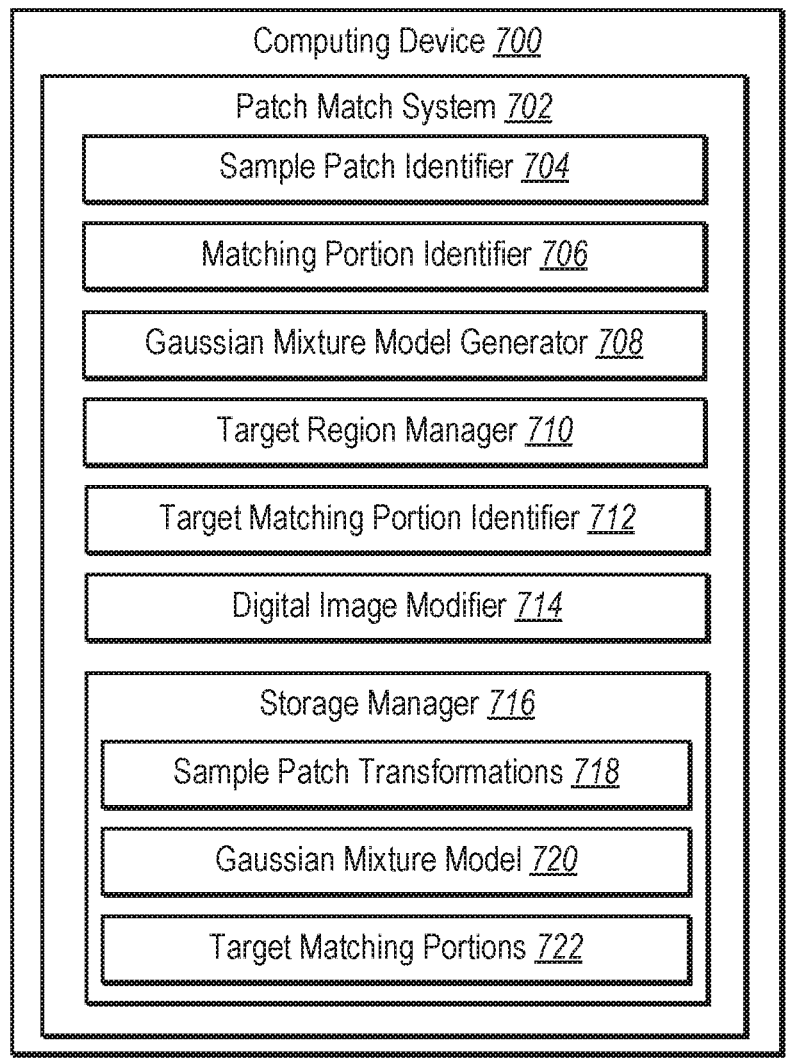
FIG. 7 illustrates a schematic diagram of a patch match system in accordance with one or more embodiments.

Looking now to FIG. 7, additional detail will be provided regarding components and capabilities of the patch match system. Specifically, FIG. 7 illustrates an example schematic diagram of a patch match system 702 on an example computing device 700 (e.g., a user client device and/or server device). As shown in FIG. 7, the patch match system 702 may include a sample patch identifier 704, a matching portion identifier 706, a Gaussian mixture model generator 708, a target region manager 710, a target matching portion identifier 712, a digital image modifier 714, and a storage manager 716. As shown in FIG. 7, each of the components of the patch match system 702 can communicate and/or interface with others of the components of the patch match system 702 to perform one or more of the functions described herein. While FIG. 7 depicts a particular number of components, in some embodiments, the patch match system 702 may include more or fewer components. In addition, the components may perform additional or alternative tasks than those described hereafter.

As mentioned, the patch match system 702 includes a sample patch identifier 704. In particular, the sample patch identifier 704 can analyze a digital image to identify, determine, or locate sample patches within the digital image. In addition, the patch match system 702 includes a matching portion identifier 706. In particular, the matching portion identifier 706 can analyze a digital image to identify potential matching portions for a given sample patch (e.g., by probabilistically sampling for corresponding matching portions from the sample patches). In addition, the matching portion identifier 706 can compare sample patches with potential matching portions to determine which portions are corresponding matching portions. For instance, as described above, the matching portion identifier 706 can determine which potential portions are within a similarity threshold of a sample patch and identify those portions as corresponding matching portions of the sample patch.

The matching portion identifier 706 can further identify transformations between sample patches and corresponding matching portions within a digital image. Indeed, the matching portion identifier 706 can determine a type of transformation (e.g., translation, rotation, scaling, reflection, etc.) and can generate correspondence vectors to represent the transformations between sample patches and corresponding matching portions. As described above, the matching portion identifier 706 can generate correspondence vectors to represent multi-dimensional transformations between sample patches and matching portions that include translation, rotation, scaling, and/or reflection.

The patch match system 702 also includes a Gaussian mixture model generator 708. As described above, the Gaussian mixture model generator 708 can generate, create, determine, organize, or compile a Gaussian mixture model composed of one or more Gaussian distributions. For instance, the Gaussian mixture model generator 708 can generate Gaussian distributions to represent the transformations identified by the matching portion identifier 706. For instance, the Gaussian mixture model generator 708 can analyze each sample correspondence vector (e.g., as generated by the matching portion identifier 706) reflecting a transformation between a patch sample and matching portion and generate a plurality of Gaussian distributions. Accordingly, the Gaussian mixture model generator 708 can generate a representation of probabilities across a digital image of finding matches of various target patches of the digital image.

FIG. 7 also illustrates that the patch match system 702 includes a target region manager 710. The target region manager 710 can identify, determine, or locate a target region within a digital image. In particular, the target region manager 710 can receive user input to select a target region within the digital image, or the target region manager 710 can otherwise identify the target region automatically without user input.

As also illustrate in FIG. 7, the patch match system 702 further includes a target matching portion identifier 712. As described above, the target matching portion identifier 712 can utilize the generated Gaussian mixture model to identify target matching portions. The target matching portion identifier 712 can identify a target matching portion that corresponds with (e.g., that matches) a target region. More specifically, the target matching portion identifier 712 can identify target matching portions that correspond to target patches within a target region. For example, the target matching portion identifier 712 can sample a Gaussian mixture model to identify a transformation from a target patch to a target matching portion. The target matching portion identifier 712 can also compare the target matching portion to neighboring pixels of the target patch to ensure that the target matching portion satisfies a similarity threshold (e.g., is a fit for the target patch).

FIG. 7 further illustrates that the patch match system 702 includes a storage manager 716. In particular, the storage manager 716 can store sample patch transformations 718, a Gaussian mixture model 720, and target matching portions 722. For instance, the Gaussian mixture model generator 708 can communicate with the storage manager 716 to store or otherwise manage or maintain a Gaussian mixture model 720 that is based on sample patch transformations 718. Additionally, the target matching portion identifier 712 can communicate with the storage manager 716 to store or maintain target matching portions 722 to use to replace a target region within the digital image. The storage manager 716 can also store original and modified digital images.

In one or more embodiments, each of the components of the patch match system 702 are in communication with one another using any suitable communication technologies. Additionally, the components of the patch match system 702 can be in communication with one or more other devices including the user client device 806 described below in relation to FIG. 8. It will be recognized that although the components of the patch match system 702 are shown to be separate in FIG. 7, any of the subcomponents may be combined into fewer components, such as into a single component, or divided into more components as may serve a particular implementation. Furthermore, although the components of FIG. 7 are described in connection with the patch match system 702, at least some of the components for performing operations in conjunction with the patch match system 702 described herein may be implemented on other devices within the environment.

The components of the patch match system 702 can include software, hardware, or both. For example, the components of the patch match system 702 can include one or more instructions stored on a computer-readable storage medium and executable by processors of one or more computing devices (e.g., the computing device 700). When executed by the one or more processors, the computer-executable instructions of the patch match system 702 can cause the computing device 700 to perform the patch matching methods described herein. Alternatively, the components of the patch match system 702 can comprise hardware, such as a special purpose processing device to perform a certain function or group of functions. Additionally or alternatively, the components of the patch match system 702 can include a combination of computer-executable instructions and hardware.

Furthermore, the components of the patch match system 702 performing the functions described herein may, for example, be implemented as part of a stand-alone application, as a module of an application, as a plug-in for applications including content management applications, as a library function or functions that may be called by other applications, and/or as a cloud-computing model. Thus, the components of the patch match system 702 may be implemented as part of a stand-alone application on a personal computing device or a mobile device. Alternatively or additionally, the components of the patch match system 702 may be implemented in any application that allows creation and delivery of marketing content to users, including, but not limited to, applications in ADOBE CREATIVE CLOUD, such as ADOBE PHOTOSHOP, ADOBE ILLUSTRATOR, ADOBE INDESIGN, ADOBE BRIDGE, ADOBE DREAMWEAVER, ADOBE LIGHTROOM, and ADOBE PREMIERE. "ADOBE", "CREATIVE CLOUD", "PHOTOSHOP," "ILLUSTRATOR," "INDESIGN," "BRIDGE," "DREAMWEAVER," "LIGHTROOM," and "PREMIERE," are registered trademarks of Adobe Systems Incorporated in the United States and/or other countries.

Figure 8:
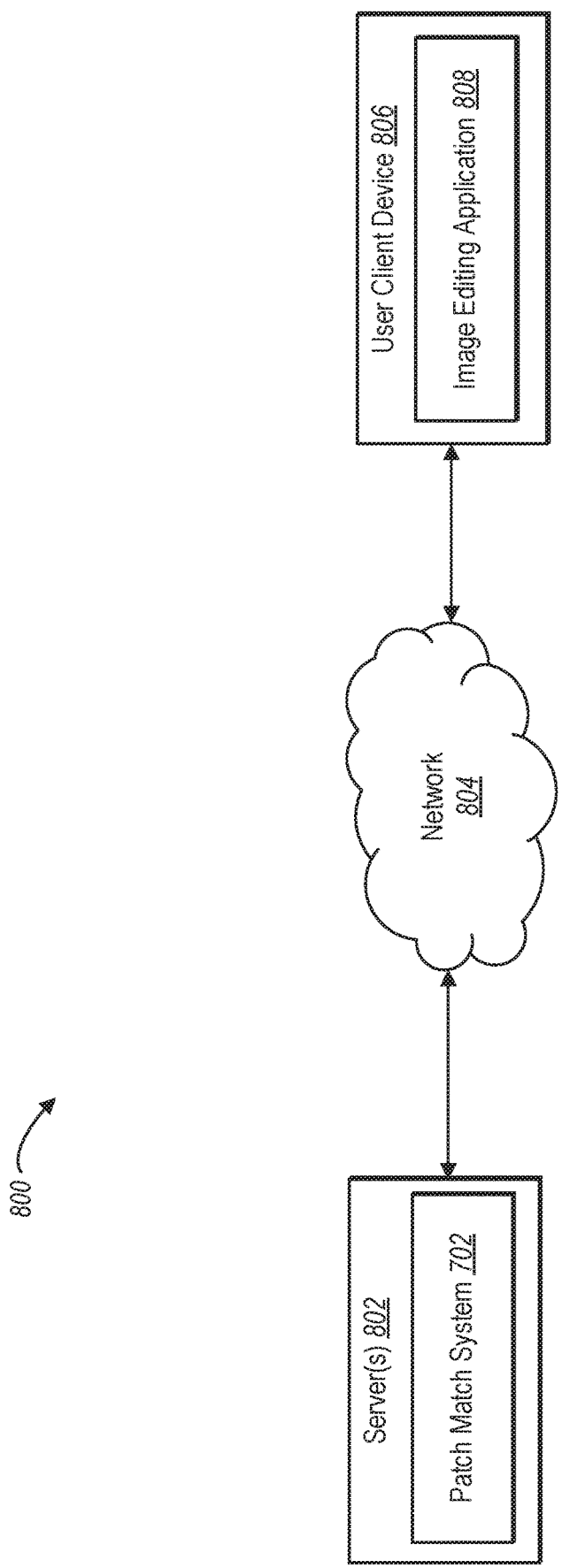
FIG. 8 illustrates an example environment for implementing a patch match system in accordance with one or more embodiments.

FIG. 8 illustrates a schematic diagram of one embodiment of an exemplary environment 800 in which the patch match system 702 operates. In one or more embodiments, the exemplary environment 800 includes a network 804, server(s) 802, and a user client device 806 including an image editing application 808. While FIG. 8 illustrates a particular arrangement of the components of the environment 800, the environment 800 may have additional or alternative arrangements.

As illustrated in FIG. 8, the environment 800 may include a network 804. In particular, the network 804 can interface the server(s) 802 and the user client device 806. Accordingly, the network 804 can facilitate communications between the server(s) 802 and the user client device 806 via appropriate network protocol. For example, the network 804 may refer to a local network (e.g., a local area network or "LAN") or a wide area network ("WAN") or may refer to different communication protocol by which two computing devices can communicate.

As also illustrated in FIG. 8, the environment 800 may include server(s) 802. The server(s) 802 may refer to one or more computing devices which can manage digital images and which can perform functions to edit or otherwise manipulate digital images. In particular, the server(s) 802 can communicate, via network 804, with the image editing application 808 on (e.g., housed within) the user client device 806. Accordingly, the server(s) 802 can communicate with the image editing application 808 to enable a user to interact with a digital image by way of the image editing application 808 to view, edit, or otherwise manipulate the digital image.

In some embodiments, the patch match system 702 can be implemented on the user client device 806, and can therefore communicate with the user client device 806 directly. Accordingly, the patch match system 702 can enable a user to edit digital images as part of a native application installed locally on the user client device as either hardware, software, or both.

Although FIG. 8 illustrates a particular arrangement of the environment 800 including the server(s) 802, the network 804, and the user client device 806, various additional or alternative arrangements are possible. For example, while FIG. 8 illustrates a single user client device 806 in communication with a network 804 and the server(s) 802, in one or more embodiments multiple user client devices may communicate directly with the server(s) 802, bypassing network 804.

To illustrate, the user client device 806 can communicate with the server(s) 802 and transmit a request to the server(s) 802 for the patch match system 702 to fill a target region. For example, the user client device 806 can request that the server(s) 802 analyze and modify a digital image captured by the user client device 806 to remove an unwanted portion of the digital image. In response to receiving the request, the server(s) 802 utilize the patch match system 702 identify sample patches, corresponding matching portions, and transformations between the sample patches and matching portions. The server(s) 802 utilize the patch match system 702 to further generate a Gaussian mixture model to represent probability distributions across the digital image of where the patch match system can search for image portions to replace the unwanted target region of the digital image. Upon identifying target matching portions to replace the target region by following the Gaussian mixture model, the server(s) 802 utilize the patch match system 702 to generate a modified digital image by replacing the target region with a target matching portion and can transmit the modified digital image via the network 804 to user client device 806.

FIGS. 1-8, the corresponding text, and the examples provide a number of different systems, methods, and non-transitory computer readable media for identifying digital image patch matches using a Gaussian mixture model. In addition to the foregoing, embodiments can also be described in terms of flowcharts comprising acts for accomplishing a particular result. For example, FIG. 9 illustrates a flowchart of an exemplary sequence of acts in accordance with one or more embodiments.

Figure 9:
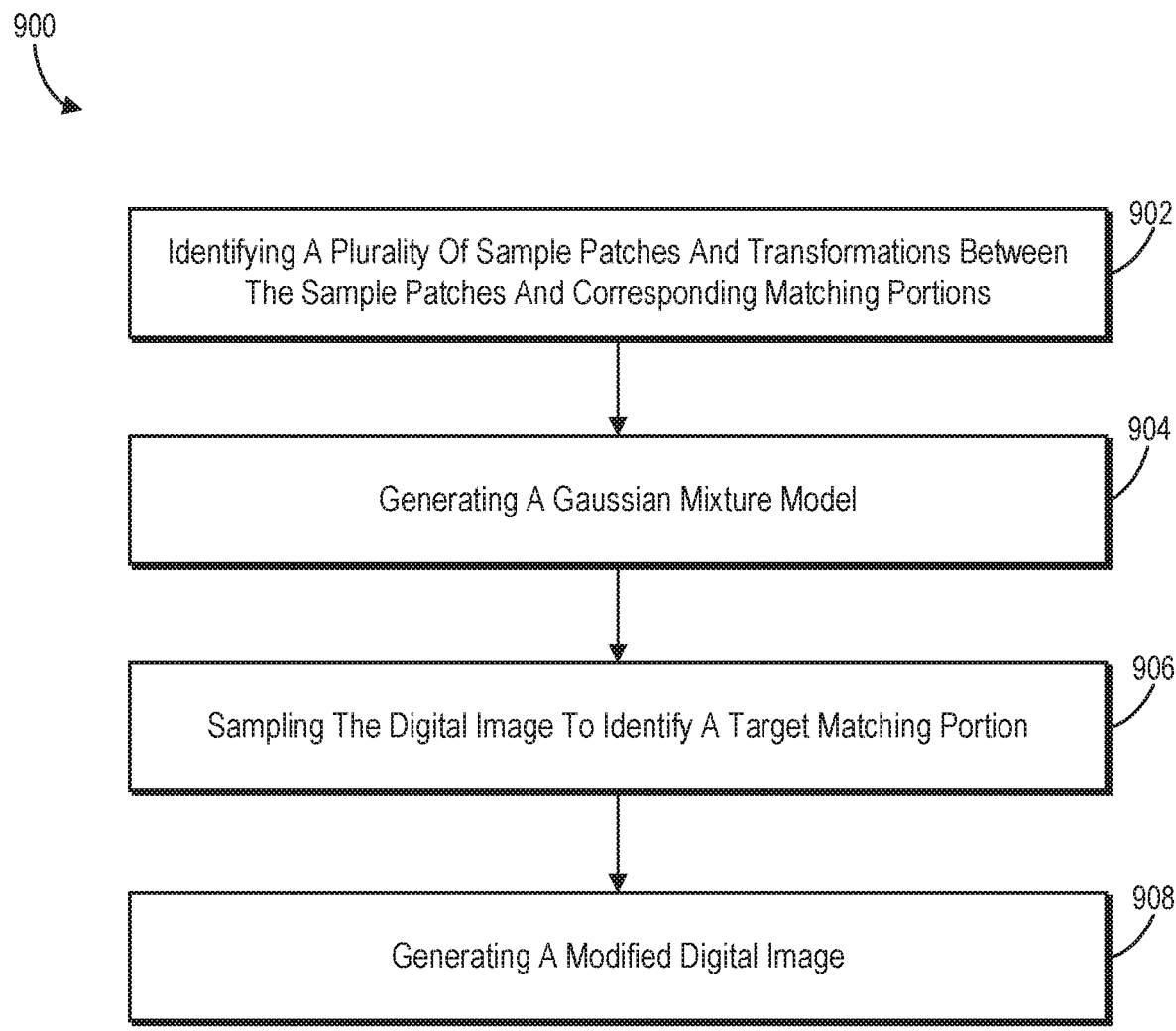
FIG. 9 illustrates a flowchart of a series of acts of modifying a digital image based on a Gaussian mixture model in accordance with one or more embodiments.

While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an exemplary series of acts 900 of modifying a digital image based on generating a Gaussian mixture model to identify patch matches. In particular the series of acts 900 can include an act 902 of identifying a plurality of sample patches and transformations between the sample patches and corresponding matching portions. For example, the 902 can involve identifying, for a digital image with a target region, a plurality of sample patches of the digital image and transformations between the plurality of sample patches and corresponding matching portions within the digital image. The act 902 can further involve determining correspondence vectors that define the transformations between the plurality of sample patches and the corresponding matching portions. In addition, the transformations between the plurality of sample patches and the corresponding matching portions can include one or more of translation, rotation, scaling, or reflection.

As shown, the series of acts 900 can also include an act 904 of generating a Gaussian mixture model. In particular, the act 904 can involve generating, based on the plurality of sample patches and the corresponding matching portions of the digital image, a Gaussian mixture model by generating a plurality of Gaussian distributions that collectively reflect the transformations between the plurality of sample patches and the corresponding matching portions. The act 904 can also involve determining, for each of the plurality of transformations between the plurality of sample patches and the corresponding matching portions: a first probability that a given transformation from among the plurality of transformations corresponds to an existing Gaussian distribution, and a second probability that the given transformation corresponds to a new Gaussian distribution. Furthermore, the act 904 can involve assigning, based on the first probability and the second probability, the given transformation to an existing Gaussian distribution within the Gaussian mixture model. The act 904 can still further involve generating, based on the first probability and the second probability, a new Gaussian distribution to fit the given transformation within the Gaussian mixture model. Each Gaussian distribution can include a number of dimensions equal to the number of degrees of freedom for transformations (e.g., the number of transformation types considered in the model).

In addition, the series of acts 900 can include an act 906 of sampling the digital image to identify a target matching portion. In particular, the act 906 can involve, for the target region, sampling the digital image in accordance with the generated Gaussian mixture model to identify a target matching portion for the target region. The act 906 can further involve sampling the digital image according to a probability function. The act 906 can also involve analyzing, based on the Gaussian mixture model, different portions of the digital image indicated by each Gaussian distribution within the Gaussian mixture model to determine the target matching portion for the target region. In addition, the act 906 can involve comparing the target matching portion with the target region.

As illustrated in FIG. 9, the series of acts 900 can further include an act 908 of generating a modified digital image. In particular, the act 908 can involve generating a modified digital image by modifying the target region utilizing the target matching portion. The act 908 can also involve comparing neighboring portions of the target region with potential target matching portions identified within the digital image in accordance with the generated Gaussian mixture model. Based on comparing the neighboring portions of the target region with the potential target matching portions, the act 908 can further involve selecting a given target matching portion from the potential target matching portions to replace at least part of the target region. The act 908 can still further involve determining that the target matching portion satisfies a threshold similarity of a neighboring portion of the target region.

Although not illustrated in FIG. 9, the series of acts 900 can further include an act of receiving, by way of a user device, a user input indicating a selection of the target region within the digital image.

Figure 10:
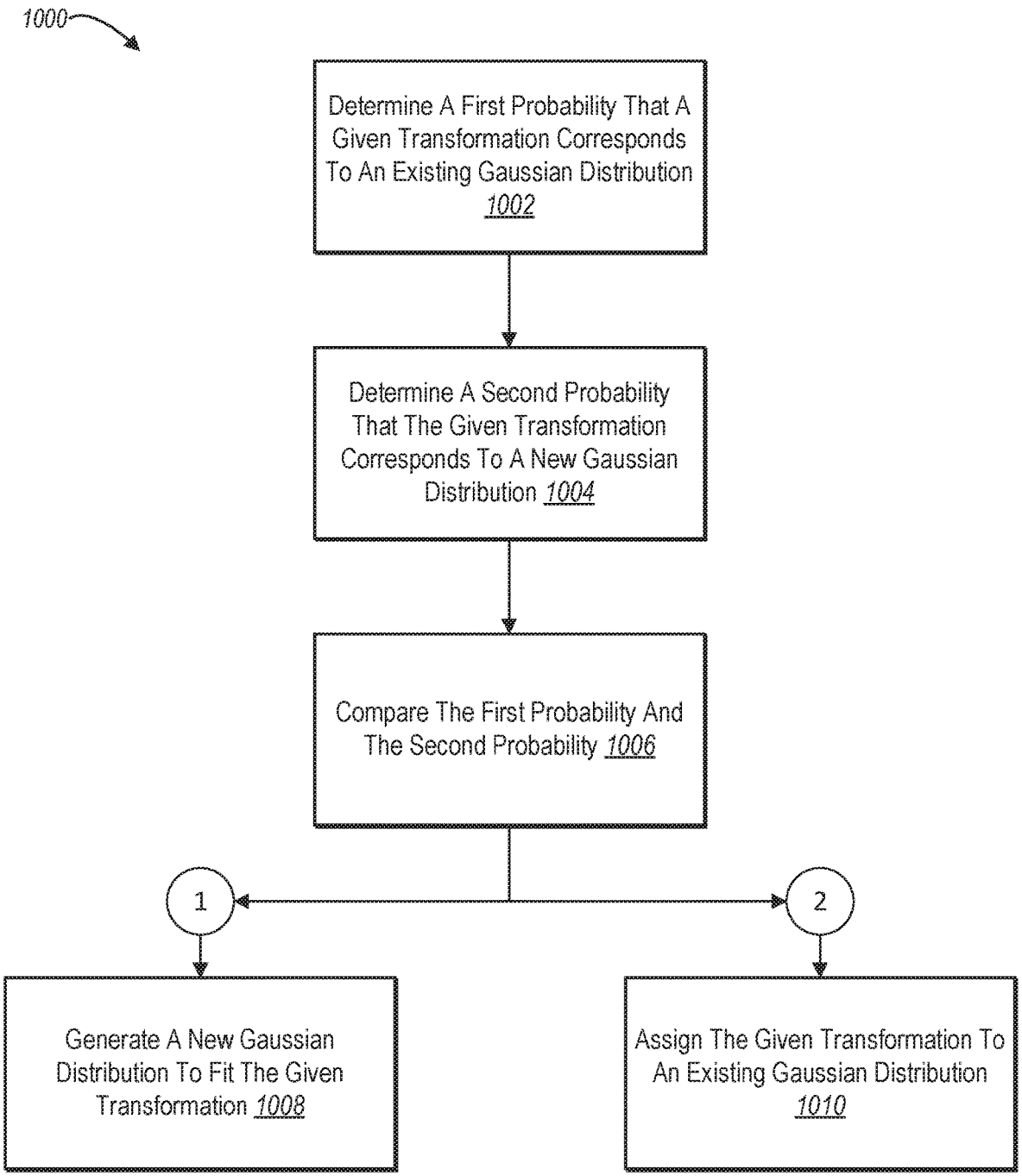
FIG. 10 illustrates a series of acts in a step for generating a Gaussian mixture model in accordance with one or more embodiments.

As mentioned above, the patch match system can generate a Gaussian mixture model based on identifying transformations between sample patches and corresponding matching portions within a digital image. Indeed, FIG. 10 illustrates a step 1000 for generating a Gaussian mixture model for a digital image. The step 1000 for generating a Gaussian mixture model for a digital image can include the below description of FIG. 10, in addition to relevant methods and techniques described elsewhere in this disclosure.

FIG. 10 illustrates step 1000 that includes acts 1002-1010. In particular, the step 1000 includes an act 1002 whereby the patch match system determines a first probability that a given transformation from among the plurality of transformations corresponds to (e.g., should be assigned to) an existing Gaussian distribution. For example, as described above, the patch match system calculates the first probability based on the transformations between the sample patches and corresponding matching portions. Specifically, in one or more embodiments, the patch match system calculates the first probability by applying a Dirichlet process that statistically analyzes each previously sampled patch and its respective transformations to corresponding matching portions to determine whether a given transformation corresponds to an existing Gaussian distribution.

The flow 1000 also includes an act 1004 for the patch match system to determine a second probability that the given transformation should be assigned to a new Gaussian distribution. In particular, the patch match system calculates the second probability according to the above-described Dirichlet process based on the transformations between the sample patches and the corresponding matching portions.

As illustrated in FIG. 10, the flow 1000 further includes an act 1006 to compare the first probability and the second probability. Indeed, as described above, the patch match system can compare the probability that a given transformation should be assigned to an existing Gaussian distribution with the probability that the given transformation should be assigned to a new Gaussian distribution. The patch match system can compare the first probability with the second probability by determining which is greater or by sampling (e.g., randomly assigning) according to the first probability and the second probability, as described above.

As illustrated in FIG. 10, the patch match system performs one of either act 1008 or act 1010 based on comparing the first probability with the second probability. For example, in cases where the patch match system determines that a given transformation should be assigned to a new Gaussian distribution, the patch match system performs act 1008 to generate a new Gaussian distribution to fit the transformation. As described above, the patch match system can generate a new Gaussian distribution to fit the transformation (e.g., center the Gaussian distribution on the sample transformation). In other cases where the patch match system determines to assign the transformation to an existing Gaussian distribution, the patch match system performs act 1010 to assign the sample patch to an existing Gaussian distribution. Indeed, as described above, the patch match system can adjust an existing Gaussian distribution to fit a given transformation.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
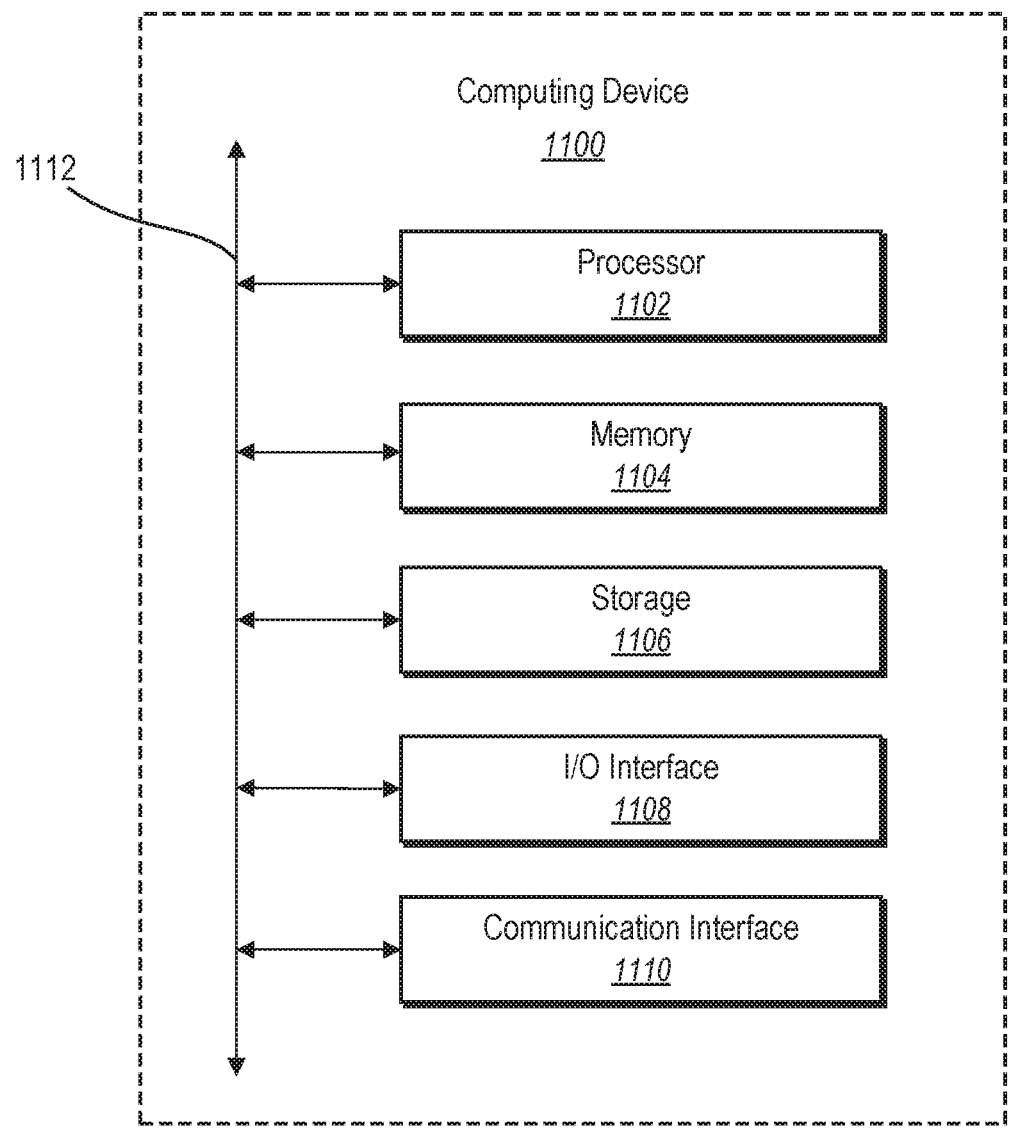
FIG. 11 illustrates a block diagram of an exemplary computing device in accordance with one or more embodiments.

FIG. 11 illustrates, in block diagram form, an exemplary computing device 1100 (e.g., computing device 800, user client device 806, and/or server(s) 802) that may be configured to perform one or more of the processes described above. One will appreciate that the patch match system can comprise implementations of the computing device 1100. As shown by FIG. 11, the computing device can comprise a processor 1102, memory 1104, a storage device 1106, an I/O interface 1108, and a communication interface 1110. Furthermore, the computing device 1100 can include an input device such as a touchscreen, mouse, keyboard, etc. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a writing device or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 800 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital environment for editing digital images, a system for patch matching to replace target regions of digital images comprising:
at least one processor; and
a non-transitory computer readable medium comprising instructions that, when executed by the at least one processor, cause the system to:
identify, for a digital image with a target region, a plurality of sample patches of the digital image;
determine transformations between the plurality of sample patches and corresponding matching portions within the digital image, the transformations comprising one or more of translation, rotation, scaling, or reflection;
generate, based on the plurality of sample patches, the corresponding matching portions of the digital image, and the transformations, a transformation Gaussian mixture model that represents probability distributions of the transformations between the plurality of sample patches and the corresponding matching portions;
for the target region, sample the digital image in accordance with the generated transformation Gaussian mixture model to identify a target matching portion for the target region; and
generate a modified digital image by modifying the target region utilizing the target matching portion.

2. The system of claim 1, wherein the instructions cause the system to identify the plurality of sample patches by probabilistically sampling the digital image to identify sample patches.

3. The system of claim 1, wherein the instructions cause the system to determine the transformations between the plurality of sample patches and corresponding matching portions by determining correspondence vectors that define the transformations between the plurality of sample patches and the corresponding matching portions.

4. The system of claim 1, wherein the transformations between the plurality of sample patches and the corresponding matching portions comprise at least two of the following: translation, rotation, scaling, and reflection.

5. The system of claim 1, wherein the transformation Gaussian mixture model represents the probability distributions of the transformations utilizing Gaussian distributions comprising a number of dimensions equal to a number of transformation types of the transformations between the plurality of sample patches and the corresponding matching portions.

6. In a digital environment for editing digital images, a non-transitory computer readable medium for patch matching to replace target regions of digital images comprising instructions that, when executed by at least one processor, cause a computer device to:
identify, for a digital image with a target region, a plurality of sample patches of the digital image;
determine transformations between the plurality of sample patches and corresponding matching portions within the digital image, the transformations comprising one or more of translation, rotation, scaling, or reflection;
generate, based on the plurality of sample patches, the corresponding matching portions of the digital image, and the transformations, a transformation Gaussian mixture model that represents probability distributions of the transformations between the plurality of sample patches and corresponding matching portions within the digital image; and
for the target region, sample the digital image in accordance with the generated transformation Gaussian mixture model to identify a target matching portion for the target region.

7. The non-transitory computer readable medium of claim 6, wherein the instructions further cause the computer device to generate a modified digital image by modifying the target region utilizing the target matching portion.

8. The non-transitory computer readable medium of claim 7, wherein the instructions cause the computer device to modify the target region by further:
comparing a neighboring portion of the target region with potential target matching portions identified within the digital image; and
based on comparing the neighboring portion of the target region with the potential target matching portions, selecting a given target matching portion from the potential target matching portions to replace at least part of the target region.

9. The non-transitory computer readable medium of claim 6, wherein the instructions cause the computer device to generate the transformation Gaussian mixture model by generating a plurality of Gaussian distributions that collectively reflect the transformations between the plurality of sample patches and the corresponding matching portions.

10. The non-transitory computer readable medium of claim 6, further comprising instructions that, when executed by the at least one processor, cause the computer device to receive, by way of a user device, a user input indicating a selection of the target region within the digital image.

11. The non-transitory computer readable medium of claim 6, wherein the instructions cause the computer device to determine the transformations between the plurality of sample patches and corresponding matching portions by determining correspondence vectors that define the transformations between the plurality of sample patches and the corresponding matching portions.

12. In a digital environment for editing digital images, a computer-implemented method for patch matching to replace target regions of digital images comprising:
identifying, for a digital image with a target region, a plurality of sample patches of the digital image;
determining transformations between the plurality of sample patches and corresponding matching portions within the digital image, the transformations comprising one or more of translation, rotation, scaling, or reflection;
generating, based on the plurality of sample patches, the corresponding matching portions of the digital image, and the transformations, a transformation Gaussian mixture model that represents probability distributions of the transformations between the plurality of sample patches and corresponding matching portions within the digital image; and
for the target region, sampling the digital image in accordance with the generated transformation Gaussian mixture model to identify a target matching portion for the target region.

13. The computer-implemented method of claim 12, wherein the transformations between the plurality of sample patches and the corresponding matching portions comprise at least two of the following transformation types: translation, rotation, scaling, and reflection.

14. The computer-implemented method of claim 12, wherein the transformations comprise a number of transformation types and each Gaussian distribution within a number of Gaussian distributions of the transformation Gaussian mixture model comprises a number of dimensions equal to the number of transformation types.

15. The computer-implemented method of claim 12, further comprising generating a modified digital image by modifying the target region utilizing the target matching portion.

16. The system of claim 1, further comprising instructions that, when executed by the at least one processor, cause the system to modify a probability distribution represented by the transformation Gaussian mixture model to include an additional transformation based on a probability that the additional transformation fits the probability distribution.

17. The system of claim 1, further comprising instructions that, when executed by the at least one processor, cause the system to generate, for a transformation from among the transformations between the plurality of sample patches and the corresponding matching portions, an additional probability distribution to add to the probability distributions based on probabilities that the transformation fits different probability distributions.

18. The non-transitory computer readable medium of claim 6, further comprising instructions that, when executed by the at least one processor, cause the computing device to modify a probability distribution represented by the transformation Gaussian mixture model to include an additional transformation based on a probability that the additional transformation fits the probability distribution.

19. The non-transitory computer readable medium of claim 6, further comprising instructions that, when executed by the at least one processor, cause the computing device to generate, for a transformation from among the transformations between the plurality of sample patches and the corresponding matching portions, an additional probability distribution to add to the probability distributions based on probabilities that the transformation fits different probability distributions.

20. The computer-implemented method of claim 15, wherein generating the modified digital image further comprises replacing pixels of the target region of the digital image with pixels of the target matching portion.

* * * * *